United States Patent
Sako

(10) Patent No.: US 7,093,754 B2
(45) Date of Patent: Aug. 22, 2006

(54) DATA RECORDING APPARATUS AND METHOD, AND DATA REPRODUCING AND METHOD

(75) Inventor: Yoichiro Sako, Tokyo (JP)

(73) Assignee: Sony Corporation, Tokyo (JP)

( * ) Notice: Subject to any disclaimer, the term of this patent is extended or adjusted under 35 U.S.C. 154(b) by 64 days.

(21) Appl. No.: 10/204,910

(22) PCT Filed: Dec. 27, 2001

(86) PCT No.: PCT/JP01/11590

§ 371 (c)(1),
(2), (4) Date: Aug. 26, 2002

(87) PCT Pub. No.: WO02/052473

PCT Pub. Date: Jul. 4, 2002

(65) Prior Publication Data

US 2003/0010819 A1    Jan. 16, 2003

(30) Foreign Application Priority Data

Dec. 27, 2000   (JP) .............................. 2000-398778

(51) Int. Cl.
*G06F 17/60*   (2006.01)
(52) U.S. Cl. ...................................... 235/385; 380/203
(58) Field of Classification Search ................ 235/385, 235/381; 705/14, 51; 707/104, 102, 10; 380/203

See application file for complete search history.

(56) References Cited

U.S. PATENT DOCUMENTS 6,102,287 A * 8/2000 Matyas, Jr.

(Continued)

FOREIGN PATENT DOCUMENTS

| EP | 0 808 048 A2 * | 11/1997 |
| JP | 10-149388 | * 6/1998 |

(Continued)

OTHER PUBLICATIONS

Masayuki Ota, Akihiro Sendai, "Version Up O Nori Konasu", Nikkei Personal Computing, Nikkei Business Publications, Inc. Nov. 17, 1997, No. 301, pp. 208-229.*

(Continued)

*Primary Examiner*—Daniel Stcyr
*Assistant Examiner*—Daniel A. Hess
(74) *Attorney, Agent, or Firm*—Finnegan, Henderson, Farabow, Garrett & Dunner, L.L.P.

(57) ABSTRACT

The present invention relates to a system for distributing and purchasing contents data by way of wired and wireless communication, said system comprises an accumulating section (33) for accumulating a plurality of contents data, an input operation section (23) to be used for selecting contents data from those accumulated in the accumulating section (3), a memory section (21) for storing the contents data selected by way of the input operation section (23), a purchase history memory section (33) for storing the package media purchase history of each user in the actual world and a control section (39) for controlling a recording according to the purchase history stored in the purchase history memory section (33). With this arrangement, the purchase history of package media is controlled by the purchase history memory section (33). Then, it is possible to provide a special discount service or the like to users/customers who have purchased package media by using the purchase history stored in the purchase history memory section (33) when the user/customer records or reproduces contents data.

32 Claims, 19 Drawing Sheets

U.S. PATENT DOCUMENTS

| | | | |
|---|---|---|---|
| 6,446,080 B1 * | 9/2002 | Van Ryzin et al. | 707/104.1 |
| 6,496,802 B1 * | 12/2002 | van Zoest et al. | 705/14 |
| 2002/0077984 A1 * | 6/2002 | Ireton | |

FOREIGN PATENT DOCUMENTS

| | | | |
|---|---|---|---|
| JP | 11-312274 | * | 11/1999 |
| JP | 2000-48085 | * | 2/2000 |
| JP | 2000-293586 | * | 10/2000 |

OTHER PUBLICATIONS

Shin Tenkai, "Point Card No Arantan Aru Senryaku", CardWave, C. media Co., Ltd., Oct. 10, 1999, vol. 12, No. 11, pp. 10 to 29.*

Internet website "http://www.columbiahouse.com/" cica 1996 as made available on the Internet Archive (http://www.archive.org.*

* cited by examiner

| ARTIST | AAA | | BBB | | CCC | | ... | |
|---|---|---|---|---|---|---|---|---|
| TUNE | a | ☐ | e | ☐ | i | ☐ | · | ☐ |
| | b | ☑ | f | ☐ | j | ☐ | · | ☐ |
| | c | ☐ | g | ☐ | k | ☐ | · | ☑ |
| | d | ☐ | h | ☐ | l | ☐ | · | ☐ |
| | · | ☐ | · | ☐ | · | ☐ | · | ☐ |
| | · | ☐ | · | ☐ | · | ☐ | · | ☐ |
| | · | ☐ | · | ☐ | · | ☐ | · | ☐ |

[TRANSMISSION]

FIG.11A

| GENRE | LOCK | | | | JAZZ | | | |
|---|---|---|---|---|---|---|---|---|
| ARTIST | AAA | | BBB | | CCC | | ... | |
| TUNE | a | ☐ | e | ☐ | i | ☐ | · | ☐ |
| | b | ☐ | f | ☐ | j | ☑ | · | ☐ |
| | c | ☐ | g | ☐ | k | ☐ | · | ☐ |
| | d | ☑ | h | ☐ | l | ☐ | · | ☐ |
| | · | ☐ | · | ☐ | · | ☐ | · | ☐ |
| | · | ☐ | · | ☐ | · | ☐ | · | ☐ |
| | · | ☐ | · | ☐ | · | ☐ | · | ☐ |

[TRANSMISSION]

FIG.11B

DATA RECORDING APPARATUS AND METHOD, AND DATA REPRODUCING AND METHOD

TECHNICAL FIELD

The present invention relates to a data recording apparatus, a data recording method, a data reproducing apparatus and a data reproducing method that are designed to activate both the market distributing contents data by means of package media and the market distributing contents data by way of wired and wireless communication means by discounting the price of the contents data being purchased by a customer by way of a wired or wireless communication means depending on the purchase history of package media of the customer and also discounting the price of the package media being purchased by a customer depending on the purchase history of contents data of the customer by way of wired and wireless communication means.

BACKGROUND ART

Conventionally, contents data such as audio data, image data, video data and computer programs are generally delivered in the form of package media that are independent recording media such as optical discs containing the data. Contents data are also electronically delivered by way of telecommunication networks such as Internet on a pay per delivery basis.

Contents data are delivered more advantageously by electronic delivery means than by package media because the former does not involve any transfer of package media that are physical objects and contents data can be directly transferred from a computer to another computer. Thus, electronic delivery means is highly effective for broad distribution of contents data. On the other band, people have the desire of possessing objects and hence may not be able to satisfy the desire unless they posses the package media they want.

DISCLOSURE OF THE INVENTION

Therefore, it is the object of the present invention to provide a data recording apparatus, a data recording method, a data reproducing apparatus and a data reproducing method adapted to activate both the market distributing contents data by means of package media and the market distributing contents data by means of wired and wireless communication means.

In an aspect of the invention, there is provided a data recording apparatus comprising an accumulating section for accumulating a plurality of contents data, a selection means for selecting at least a contents data out of the plurality of contents data accumulated in the accumulating section in response to a user/customer input, a recording section for recording the contents data selected by the selection means in a memory means, a purchase history memory section for storing the package media purchase history of the user/customer in the actual world and a control section for controlling the recording section according to the purchase history stored in the purchase history memory section.

Preferably, a data recording apparatus according to the invention further comprises a billing means for generating a billing data to be stored in the memory section at the time of recording the contents data selected by the selection means in the storage section by the recording section according to the package media purchase history of each user/customer.

Preferably, a data recording apparatus according to the invention further comprises an input section for inputting the user/customer identifier of the user/customer purchasing the package media and the media identifier of the package media, a determining section for determining if the media identified by the media identifier is covered by the delivery service or not and an updating means for incrementing the number of purchase slips stored in the purchase history memory section and corresponding to the user/customer identifier input with the media identifier as determined to be covered by the delivery service by the determining section.

In the data recording apparatus, the control section controls so as to prohibit the recording section from recording the contents data therein when the purchase history memory section does not store any purchase history of the user/customer.

In another aspect of the invention, there is provided a data reproducing apparatus comprising an accumulating section for accumulating a plurality of contents data, a selection means for selecting at least a contents data out of the plurality of contents data accumulated in the accumulating section in response to a user/customer input, a reproducing section for reproducing the contents data selected by the selection means, a purchase history memory section for storing the package media purchase history of the user/customer in the actual world and a control section for controlling the reproducing section according to the purchase history stored in the purchase history memory section.

Preferably, a data reproducing apparatus according to the invention further comprises a billing means for generating a billing data at the time of reproducing by said reproducing section the contents data selected by the selection means on the basis of the package media purchase history of each user/customer.

Preferably, a data reproducing apparatus according to the invention further comprises an input section for inputting the user/customer identifier of the user/customer purchasing the package media and the media identifier of the package media, a determining section for determining if the media identified by the media identifier is covered by the delivery service or not and an updating means for incrementing the number of purchase slips stored in the purchase history memory section and corresponding to the user/customer identifier input with the media identifier as determined to be covered by the delivery service by the determining section.

In the data reproducing apparatus, the control section controls so as to prohibit the reproducing section from reproducing the contents data when the purchase history memory section does not store any purchase history of the user/customer.

In still another aspect of the invention, there is provided a communication apparatus comprising an accumulating section for accumulating a plurality of contents data, a purchase history memory section for storing the package media purchase history of the user/customer in the actual world, a transmitting section for transmitting at least one of the plurality of contents data accumulated in the accumulating section and the purchase history corresponding to the user/customer to the user/customer terminal and a control section for controlling the operation of recording the contents data in the memory section at the user/customer terminal according to the purchase history stored in the purchase history memory section.

Preferably, a communication apparatus according to the invention further comprises a receiving section for receiving the user/customer identifier of the user/customer purchasing the package media and the media identifier of the package media, a determining section for determining if the media identified by the media identifier is covered by the delivery service or not and an updating means for incrementing the number of purchase slips stored in the purchase history memory section and corresponding to the user/customer identifier input with the media identifier as determined to be covered by the delivery service by the determining section.

In still another aspect of the invention, there is provided a data recording apparatus comprising a selection means for selecting at least a contents data out of the plurality of contents data accumulated in an accumulating section in response to a user/customer input, a recording section for recording the contents data selected by the selection means in a memory means and a control section for controlling the recording section according to the package media purchase history of the user/customer in the actual world.

Preferably, a data recording apparatus according to the invention further comprises a billing means for generating a billing data at the time of recording by the recording section of the contents data selected by the selection means in the memory section according to the package media purchase history of each user/customer.

Preferably, a data recording apparatus according to the invention further comprises a reading section for reading a media identifier from a package media and a transmitting means for transmitting the user/customer identifier with the media identifier read by the reading section.

In still another aspect of the invention, there is provided a communication apparatus comprising an accumulating section for accumulating a plurality of contents data, a purchase history memory section for storing the package media purchase history of the user/customer in the actual world, a transmitting section for transmitting at least one of the plurality of contents data accumulated in the accumulating section and the purchase history corresponding to the user/customer to the user/customer terminal and a control section for controlling the operation of reproducing the contents data in the memory section at the user/customer terminal according to the purchase history stored in the purchase history memory section.

Preferably, a communication apparatus according to the invention further comprises a receiving section for receiving the user/customer identifier of the user/customer purchasing the package media and the media identifier of the package media, a determining section for determining if the media identified by the media identifier is covered by the delivery service or not and an updating means for incrementing the number of purchase slips stored in the purchase history memory section and corresponding to the user/customer identifier input with the media identifier as determined to be covered by the delivery service by the determining section.

In still another aspect of the invention, there is provided a data reproducing apparatus comprising a selection means for selecting at least a contents data out of the plurality of contents data accumulated in an accumulating section in response to a user/customer input, a reproducing section for reproducing the contents data selected by the selection means and a control section for controlling the reproducing section according to the package media purchase history of the user/customer in the actual world.

Preferably, a data reproducing apparatus according to the invention further comprises a billing means for generating a billing data at the time of reproducing by the reproducing section of the contents data selected by the selection means according to the package media purchase history of each user/customer.

Preferably, a data reproducing apparatus according to the invention further comprises a reading section for reading a media identifier from a package media and a transmitting section for transmitting the user/customer identifier with the media identifier read by the reading section.

In still another aspect of the invention, there is provided a data recording apparatus comprising an accumulating section for accumulating a plurality of contents data, a selection means for selecting at least a contents data out of the plurality of contents data accumulated in the accumulating section in response to a user/customer input, a recording means for recording the contents data selected by the selection means and stored in a memory section, a number of times of recording data generating section for generating number of times of recording data according to the number of times of recording by the recording means of the contents data in the memory section and a discount data generating section for generating discount data to be used at the time when the package media is purchased as a function of the number of times of recording data generated by the number of times of recording data generating section.

In still another aspect of the invention, there is provided a data reproducing apparatus comprising an accumulating section for accumulating a plurality of contents data, a selection means for selecting at least a contents data out of the plurality of contents data accumulated in the accumulating section in response to a user/customer input, a reproducing section for reproducing the contents data selected by the selection means, a number of times of reproduction data generating section for generating number of times of reproduction data according to the number of times of reproduction by the reproducing section of the contents data and a discount data generating section for generating discount data to be used at the time when the package media is purchased as a function of the number of times of reproduction data generated by the number of times of reproduction data generating section.

In still another aspect of the invention, there is provided a data recording method comprising a step of selecting at least a contents data out of the plurality of contents data accumulated in an accumulating means in response to a user/customer input, a step of storing the package media purchase history of the user/customer in the actual world and a step of recording the selected contents data in a memory section according to the purchase history.

In still another aspect of the invention, there is provided a data reproducing method comprising a step of selecting at least a contents data out of the plurality of contents data accumulated in an accumulating section in response to a user/customer input, a step of storing the package media purchase history of the user/customer in the actual world and a step of reproducing the selected contents data according to the purchase history.

In a further aspect of the invention, there is provided a communication method comprising a step of storing the package media purchase history of the user/customer in the actual world, a step of transmitting at least a contents data out of the plurality of contents data accumulated in an accumulating section and the purchase history of the user/customer to the user/customer terminal and a step of controlling the operation of recording the contents data to a memory means at the user/customer terminal according to the purchase history.

These and other objects of the present invention and specific advantages that can be obtained by the present invention will become apparent from the following description of preferred embodiments.

BRIEF DESCRIPTION OF THE DRAWINGS

FIGS. 11A and 11B are schematic illustration of the images that can be displayed on the display section of the recording/reproduction apparatus when an audio data is selected.

BEST MODES FOR CARRYING OUT THE INVENTION

Now, a data recording/reproduction system to which the present invention is applied will be described by referring to the accompanying drawings.

Figure 1:
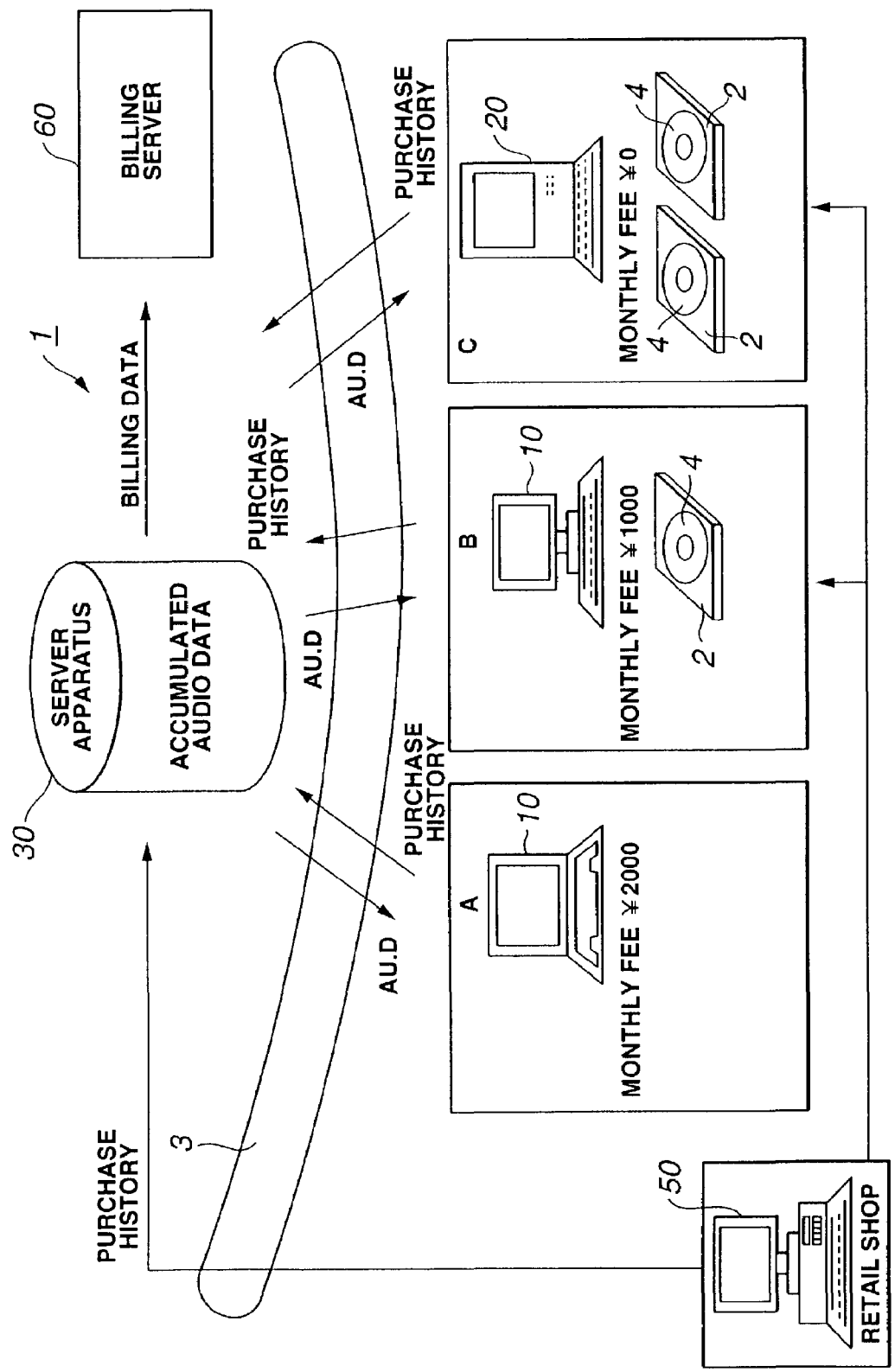
FIG. 1 is a schematic illustration of the service of a data recording/reproduction system to which the present invention is applied.

Referring to FIG. 1, the data recording/reproduction system 1 to which the present invention is applied comprises recording/reproduction apparatus 10, 20 owned respectively by user A, user B, user C, . . . (to be also referred to as users/customers hereinafter) and adapted to record data in and reproduce data from a recording media that is a package media 2, a server apparatus 30 owned by the service provider that may be a record company or the like and adapted to accumulate audio data to be distributed to users/customers and transmit audio data to the accessing recording/reproduction apparatus 10 and terminals 50 owned by respective retails stores who sell package media 2 and adapted to transmit the purchase history of each user/customer who purchased an optical disc 4 to the server apparatus 30. The data recording/reproduction system 1 further comprises a billing server apparatus 60 for billing the user/customer who downloaded audio data AU. D from the server apparatus 30. In the data recording/reproduction system 1 having the above described configuration, the recording/reproduction apparatus 10 of the users/customers, the terminals 50 and the billing server apparatus 60 are connected to the server apparatus 30 in Internet by way of telecommunication lines such as ISDN (integrated services digital network) lines, CATV (cable television) lines and optical cable lines.

Each user/customer has made an agreement with the record company who runs the server apparatus 30 typically on a monthly subscription fee basis or a pay per delivery basis of paying for each delivered piece of music so that he or she can download audio data AU. D he or she likes without limitation.

Additionally, the user/customer can acquire a music album or a piece of music of his or her favorite artist by purchasing a package media 2 which may be a compact disc (to be also referred to also as CD hereinafter) or a digital versatile disc (to be also referred to simply as DVD hereinafter) at a retail shop selling recording media that the user/customer likes. The recording media and the containers containing them are provided with an identifier ID for identifying each recording media. When a user/customer purchases a recording media at a retail shop, the latter transmits the recording media ID of the recording media along with the purchaser ID (the user/customer ID if the purchaser is a subscriber for electronic music delivery) from its terminal 50 to the server apparatus 30.

Alternatively, it may be so arranged that the recording media ID and the purchaser (user/customer) ID are transmitted to the server apparatus 30 automatically or by a manual operation of the user/customer when the package media 2, or the recording media, is set in position in the recording/reproduction apparatus 10 owned by the user/customer.

Additionally, the user/customer can access the server apparatus 30 and download desired audio data AU. D by way of the recording/reproduction apparatus 10 typically on a monthly subscription fee basis or a pay per tune basis. The server apparatus 30 counts the number of package media purchased by each purchaser (user/customer) by referring to the purchaser (user/customer) ID so that a discount service may be provided in the agreement to be made for downloading audio data AU. D from the server apparatus 30 on the basis of the number of purchased package media.

Figure 2:
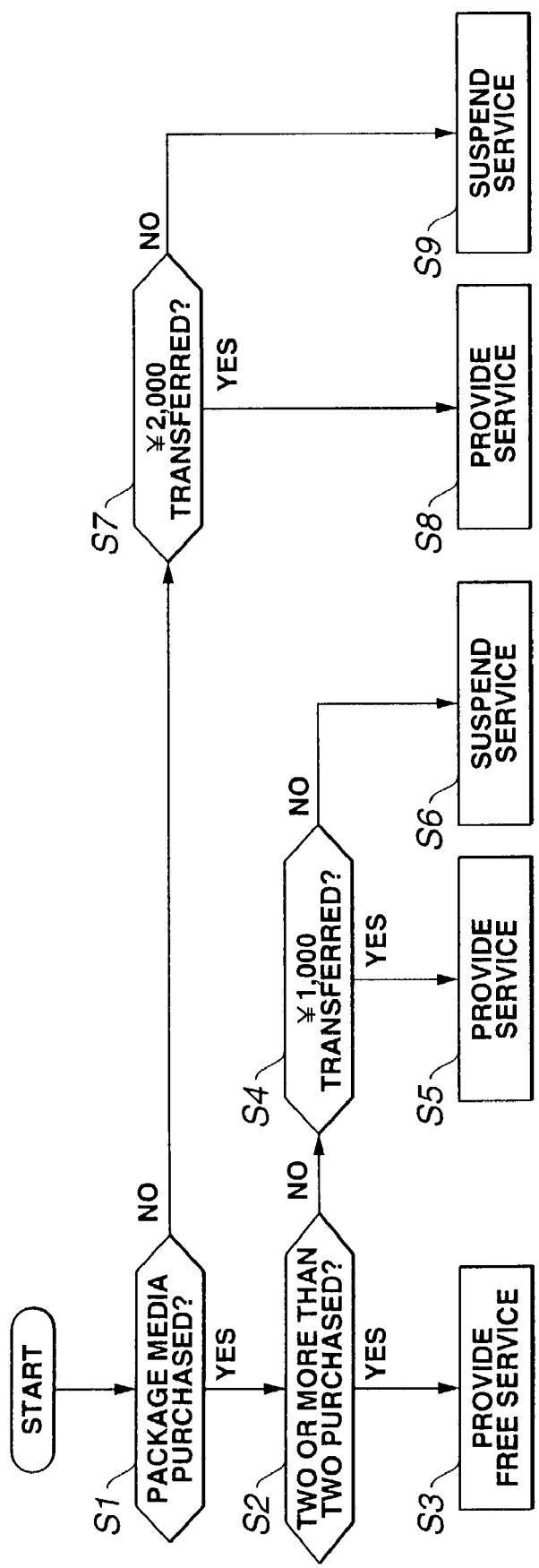
FIG. 2 is a flow chart illustrating the service provided by the data recording/reproduction system of FIG. 1.

More specifically, referring now to FIG. 2, when the user/customer wants to make an agreement under which he or she can download audio data AU. D by way of Internet 3 in Step S1, the record company determines if the user/customer trying to conclude the agreement is a purchaser of package media 2 or not. The record company proceeds to Step S2 when the user/customer is a purchaser of package media 2, whereas it proceeds to Step S7 when the user/customer is not a purchaser of package media 2.

Then, in Step S2, the record company determines if the user/customer has purchased a predetermined number of package media, e.g., two or more than two package media 2, in a predetermined period of time or not. The record company proceeds to Step S3 if the user/customer has purchased two or more than two package media 2, whereas it proceeds to Step S4 if the user/customer has not purchased the predetermined number of package media. Note that the number of package media that provides the basis of judgment is not limited to two or more than two.

In Step S3, the record company provides a free service and does not bill at all if the user/customer has purchased two or more than two package media 2.

If the user/customer has purchased a package media 2 but has not purchased two or more than two package media 2 in the past, the record company proceeds to Step S4, where the record company charges ¥1,000 to the user for the agreement and determines if ¥1,000 has been paid or not. Then, the record company proceeds to Step S5 if it determines that ¥1,000 has been paid, whereas it proceeds to Step S6 if it determines that ¥1,000 has not been paid.

In Step S5, the record company provides the service of the agreement for ¥1,000. On the other hand, it determines that the agreement has not been successfully concluded in Step S6 and hence does not provide any service.

If the user/customer is not a purchaser of package media 2, the record company charges ¥2,000 to the user for the agreement and determines if ¥2,000 has been paid or not in Step S7. Then, the record company proceeds to Step S8 if it determines that ¥2,000 has been paid, whereas it proceeds to Step S9 if it determines that ¥2,000 has not been paid.

In Step S8, the record company provides the service of the agreement for ¥2,000. On the other hand, it determines that the agreement has not been successfully concluded in Step S9 and hence does not provide any service.

With the data recording/reproduction system 1, the user/customer is provided with a discount service for EMD (electronic music distribution) depending on the number of package media 2 he or she has purchased so that the user/customer who have purchased package media 2 may be encouraged and motivated to subscribe for the service of electronic music delivery, while the user/customer of the electronic music delivery may be encouraged and motivated 10 purchase package media 2. Therefore, the data recording/reproduction system 1 can activate both the market of package media 2 and the market of electronic music distribution.

Figure 3:
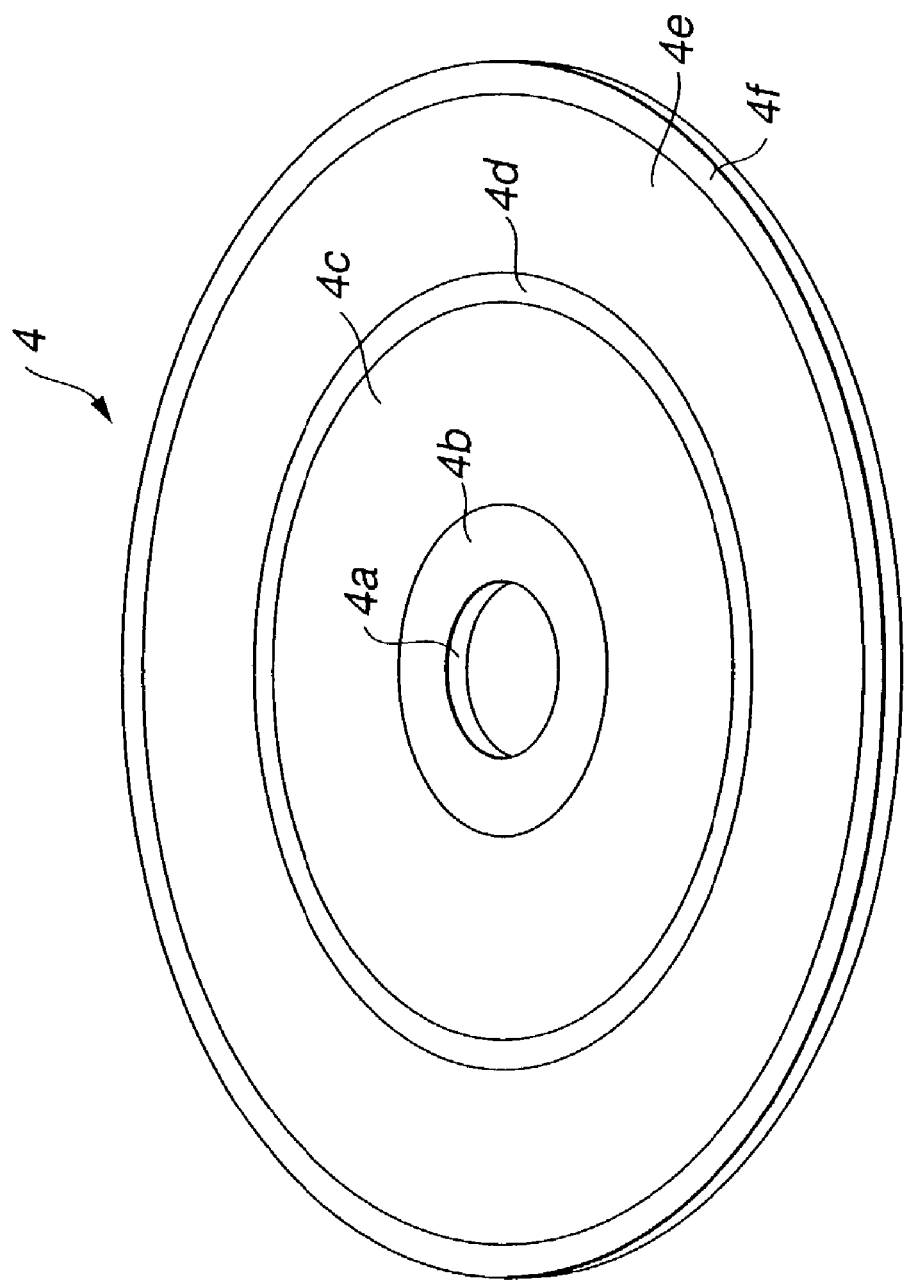
FIG. 3 is a schematic perspective views of an optical disc that can be used as a package media, which may be an object of discount service when it is used for electronic music delivery by the service of FIG. 2.

Now, an optical disc 4 that can be used as a package media 2 that may be an object of discount service when it is used for electronic music delivery by the service of the data recording/reproduction system 1 to which the present invention is applied will be described by referring to FIG. 3. The optical disc 4 is provided with an inner peripheral side non-signal recording region 4*b* at the outer periphery of the center hole 4*a* that is to be engaged with the disc table of the disc drive/operation mechanism of the recording/reproduction apparatus 10, a first data recording region 4*c* at the outer periphery of the non-signal recording region 4*b*, an identification data recording region 4*d* for recording the recording media ID and other data of the optical disc at the outer periphery of the first data recording region 4*c*, a second data recording region 4*e* at the outer periphery of the identification data recording region 4*d* and an outer peripheral side non-signal recording region 4*f* at the outer periphery of the second data recording region 4*e*.

Audio data that constitute the first digital contents are recorded in the first data recording region 4*c* with the conventional recording format of CDs at a recording density same as that of CDs. In other words, the audio data recorded in the first data region 4*e* can be reproduced by any existing CD reproducing apparatus. Note that the first digital contents are audio data of a sound quality same as that of ordinary CDs. It may be needless to say that it may be audio data or image data to be used for the purpose of advertising the digital contents recorded in the second data region 4*e*.

The second digital contents are recorded in the second data region 4*e* in a recording format same as that the first data region 4*c* at a recording density twice as high as that of the first data region 4*c*. The second digital contents recorded in the second data region 4*e* may or may not relate to the first digital contents. The second digital contents may typically be signal-compressed image data and/or text data that may be related to the first digital contents. More specifically, they may include posters, lyric lines of songs, interview articles, guides for newly released songs and so on. The second digital contents may alternatively be audio data having a quality higher than the first digital contents. The second digital contents recorded in the second data region 4*e* may be coded so that they may be decoded and reproduced only when the optical disc is set in a dedicated recording/reproduction apparatus 10.

Furthermore, the identification data recording region 4*d* stores the recording media ID specific to the recording media so that the optical disc 4 may be identified by referring to the ID as well as the manufacturing apparatus ID for identifying the apparatus that was used for manufacturing the optical disc 4, the copy right ID for identifying the owner of the copy right of the contents data and the responsible person who controls the copy right, the URL (uniform resource locator) for accessing the predetermined web sites on Internet that relates to the first and second disc contents recorded on the optical disc 4 and so on.

Retail shops sell optical discs 4 as described above in the form of package media 2 containing such optical discs 4 along with cards showing lyric lines and leaflets illustrating artist to user/customers. Their recording media IDs may be printed on the containers of the package media 2 so that retail shops may recognize them.

Figure 4:
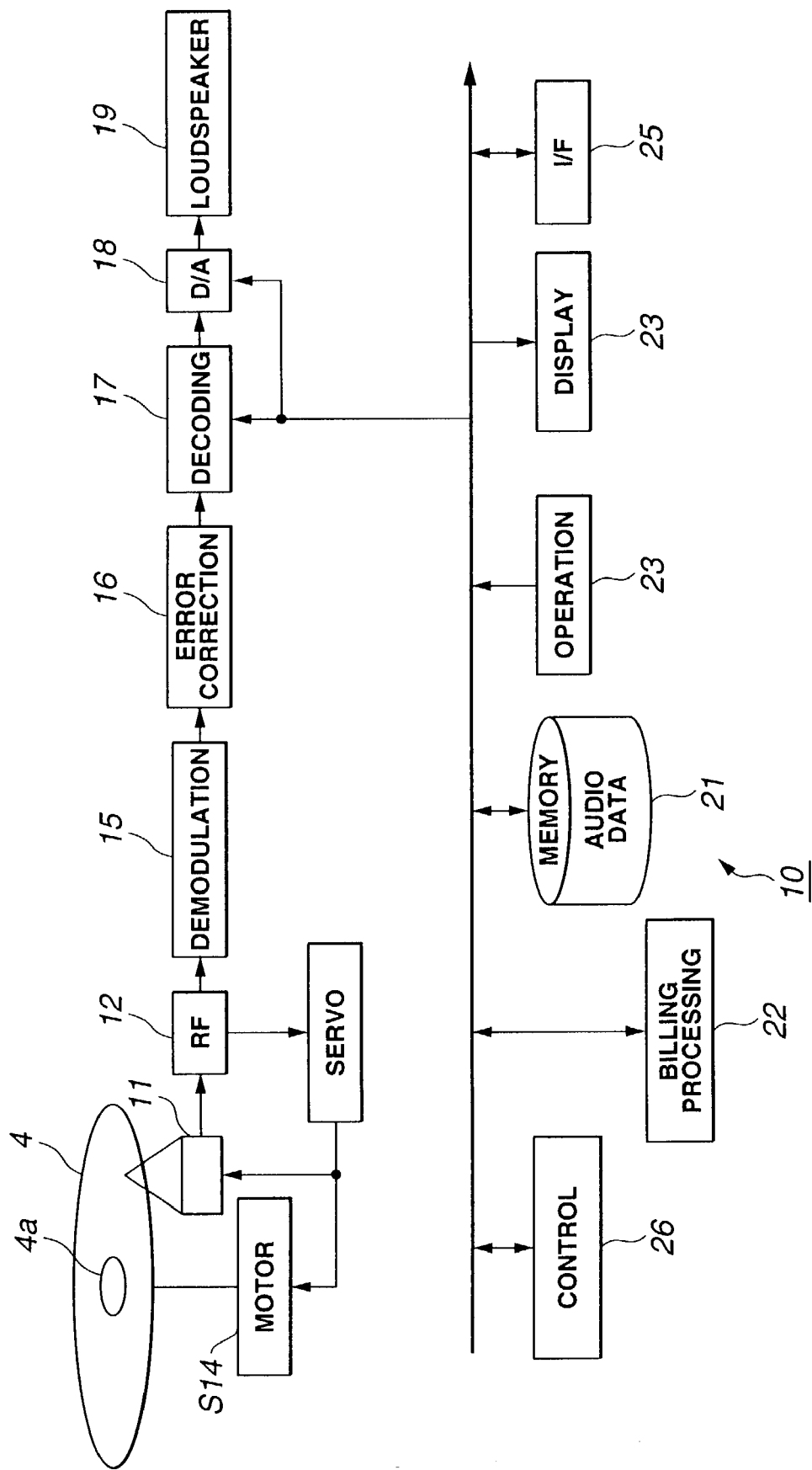
FIG. 4 is a schematic block diagram of a recording/reproduction apparatus that can be used for the optical disc of FIG. 3.

Now, a recording/reproduction apparatus 10 to be used for reproducing an optical disc 4 will be described below. Referring to FIG. 4, the recording/reproduction apparatus 10 comprises an optical pickup 11, an RF circuit 12 for receiving the output of the optical output 11, a servo circuit 13 for generating a focussing servo signal and a tracking servo signal for the objective lens according to the output of the RF circuit 12, a motor 14 for driving the optical disc 4 to rotate, a demodulator 15 for demodulating the output of the RF circuit 12, an error correction circuit 16 for correcting errors in the output of the demodulator 15, a decoder 17 for decoding coded data, a D/A converter 18 for converting digital signals into analog signals and a loudspeaker 19 for outputting the audio data that has been converted into an analog signal.

The RF circuit 12 generates RF signals, focussing error signals and tracking error signals according to the output signal of the photodetector that the optical pickup 11 comprises. For example, a focussing error signal is generated by means of an astigmatism method and a tracking error signal is generated by means of 3-beam method or a push-pull method. The RF circuit 12 outputs an RF signal to the demodulator 15 and a focussing error signal and a tracking error signal to the servo circuit 13.

The servo circuit 13 generates servo signals necessary for reproducing the optical disc 4. More specifically, the servo circuit 13 generates a focussing servo signal on the basis of the focussing error signal so as to reduce the focussing error signal equal to 0 and the servo circuit 13 also generates a tracking servo signal on the basis of the tracking error signal so as to reduce the tracking error signal equal to 0. Then, the servo circuit 13 outputs the focussing servo signal and the tracking servo signal to the drive circuit of the objective lens drive mechanism that the optical pickup 11 comprises. Then, the drive circuit controls the operation of driving the objective lens drive mechanism that by turn drives the objective lens according to the focussing servo signal and the tracking servo signal. More specifically, the drive circuit drives a biaxial actuator according to the focussing servo signal so as to drive and displace the objective lens in the focussing direction that is parallel to the optical axis of the objective lens and also drives the biaxial actuator according to the tracking servo signal so as to drive and displace the objective lens in the tracking direction that is perpendicular to the optical axis of the objective lens. Additionally, the servo circuit 13 outputs a servo signal for servo-controlling the motor 14 to the motor 14 so that the optical disc 4 may be driven and controlled so as to rotate at a constant linear velocity. The output shaft of the motor 14 is provided with a disc table that belongs to the disc rotation operation mechanism so that the optical disc 4 rotates integrally with the output shaft at a constant linear velocity as its center hole 4a is engaged with the disc table.

The demodulator 15 EFM demodulates the audio data that has been modulated by an algorithm such as EFM (eight to fourteen modulation) and read out from the optical disc 4. The error correction circuit 16 performs an error correcting operation on the audio data according to an algorithm such as the cross interleave Reed-Solomon code (CIRC) and outputs the data that has been corrected for errors to the decoder 17.

The decoder 17 has a decoding key for decoding the second contents data that is encoded and recorded in the second data region 4e of the optical disc 4. As the second contents data is input to it from the error correction circuit 16, it decodes the second contents data by means of the decoding key it stores in advance. When reproducing the audio data downloaded to it by way of Internet 3, the decoder 17 also decodes the audio data by means of the decoding key it stores in advance or the decoding key downloaded from the server apparatus 30. The decoder 17 outputs the first digital contents and the second digital contents to the D/A converter when they are audio data and outputs them to the display section when they are image data.

The D/A converter 18 converts the digital signals including the audio data input to it from the decoder 17 into analog signals and outputs them to the loudspeaker 19. The loudspeaker 19 converts the electric signals into sounds by electro-acoustic conversion and outputs the sounds.

As shown in FIG. 4, the recording/reproduction apparatus 10 comprises a memory section 21 for storing the audio data downloaded from the server apparatus 30, a billing processing section 22 for performing a billing operation when reproducing the audio data downloaded from the server apparatus 30, an input operation section 23 for performing character input operations and selective operations, a display section 24 for displaying image data, a communication interface (to be referred to simply as communication I/F hereinafter) 25 to be used for transmitting and receiving data by way of Internet 3 and a control section 26 for controlling the overall operation of the apparatus.

The memory section 21 typically comprises a hard disc and stores the audio data downloaded from the server apparatus 30 along with various application programs such as a viewing/retrieving program to be used for viewing the home page of the server apparatus 30. The memory section 21 additionally stores the recording media ID read out from the identification data recording region 4d of the optical disc 4.

The billing processing section 22 performs a billing operation when the audio data downloaded from the server apparatus 30 is decoded by the decoder 17 and reproduced from the recording/reproduction apparatus 10.

The input operation section 23 comprises a replay button for starting an operation of reading the first and second digital contents recorded on the optical disc 4, a replay stop button for stopping the replay operation, a forward track jump button for forwardly jumping recording tracks of the optical disc 4, a backward track jump button for backwardly jumping recording tracks of the optical disc 4, a keyboard provided with keys for inputting characters and ten keys and a mouse for inputting the cursor position on the display screen. For example, the keyboard is used when the user/customer accesses a predetermined home page by way of Internet 3 and inputs a URL. The mouse is used when a list of audio data that can be downloaded is displayed on the display section 24 and the user/customer selects one or more than one audio data to be downloaded from the audio data of the list.

The display section 24 comprises a CRT (cathode ray tube) or a liquid crystal display panel and is used to display the image data recorded on the optical disc 4, the time for reproducing the optical disc 4 and information relating to the optical disc 4 such as the track number that is currently reproducing data. The display section 24 also displays the home page when the user/customer accesses a predetermined URL.

The recording/reproduction apparatus 10 having the above described configuration operates in a manner as described below for reproducing an optical disc 4. As the user/customer depresses the replay button of the input operation section 23, the motor 14 is driven to by turn drive the optical disc 4 to rotate at a constant linear velocity. At the same time, the optical pickup 11 irradiates a light beam to the signal recording surface of the optical disc 4. The light beam reflected by the signal recording surface of the optical disc 4 is converted into an electric signal by a photodetector, which then outputs the electric signal to the RF circuit 12. The RF circuit 12 generates an RF signal and outputs it to the decoder 15. At the same time, it also generates a focusing error signal and a tracking error signal and outputs them to the servo circuit 13.

The servo circuit 13 generates a focusing servo signal and a tracking servo signal respectively according to the focusing error signal and the tracking error signal and outputs the error signals to the drive circuit of the objective lens drive mechanism that the optical pickup 11 comprises. Then, the optical pickup 11 drives the objective lens drive mechanism in order to control the objective lens for the purpose of focusing by driving and displacing the objective lens in the direction of the optical axis and for the purpose of tracking by driving and displacing the objective lens in a direction perpendicular to the optical axis of the objective lens.

The demodulator 15 demodulates the RF signal input from the RF circuit 12 according to the EFM (eight to fourteen modulation) algorithm and outputs the demodulated signal to the error correction circuit 16. The error correction circuit 16 performs an error correcting operation on the signal according to the CIRC algorithm and outputs the error-corrected signal to the decoder 17. The decoder 17 decodes the second contents data by means of the decoding key it stores in advance and outputs the decoded second contents data to the D/A converter 18. If the first digital contents data input to the decoder 17 is not encoded, the latter forwards it to the D/A converter 18 without performing any processing operation on it. The D/A converter 18 converts the digital signal into an analog signal and outputs the analog signal to the loudspeaker 19. Then, the loudspeaker 19 converts the electric signal into a sound by electro-acoustic conversion and outputs the sound.

When viewing the home page of the server apparatus 30 that is to be used for downloading audio data, the user/customer inputs the URL indicating the address of the home page by means of the keyboard and the mouse of the input operation section 23. Then, the control section 26 executes the viewing/retrieving program and the transmission protocol that may be TCP/IP (transmission control protocol/Internet protocol). As a result, the recording/reproduction apparatus 10 accesses the server apparatus 30 by way of Internet 3 and downloads the home page, which is then displayed on the display section 24. Subsequently, the control section 26 transmits the recording media ID recorded on the optical disc 4 and the user/customer ID automatically or in response to the manual operation of the input operation section 23 to the server apparatus 30 as purchase history information. As one or more than one audio data are selected for downloading by means of the mouse of the input operation section 23, the control section 26 downloads the selected audio data and stores in the memory section 21.

When the replay button is depressed to replay the audio data downloaded from the server apparatus 30 and stored in the memory section 21, the control section 26 reads out the selected audio data from the memory section 21 and outputs it to the decoder 17 if it is encoded but outputs the audio data to the D/A converter 18 if it is not encoded. The D/A converter 18 converts the digital signal into an analog signal and outputs the analog signal to the loudspeaker 19. Then, the loudspeaker 19 converts the electric signal into a sound by electro-acoustic conversion and outputs the sound.

When audio data are recorded or reproduced on a pay per tune basis, the billing processing section 22 operates for billing. When a predetermined period of time has passed, the control section 26 transmits the billing data recorded in the billing processing section 22 to the server apparatus 30 by way of the communication I/F 25.

Figure 5:
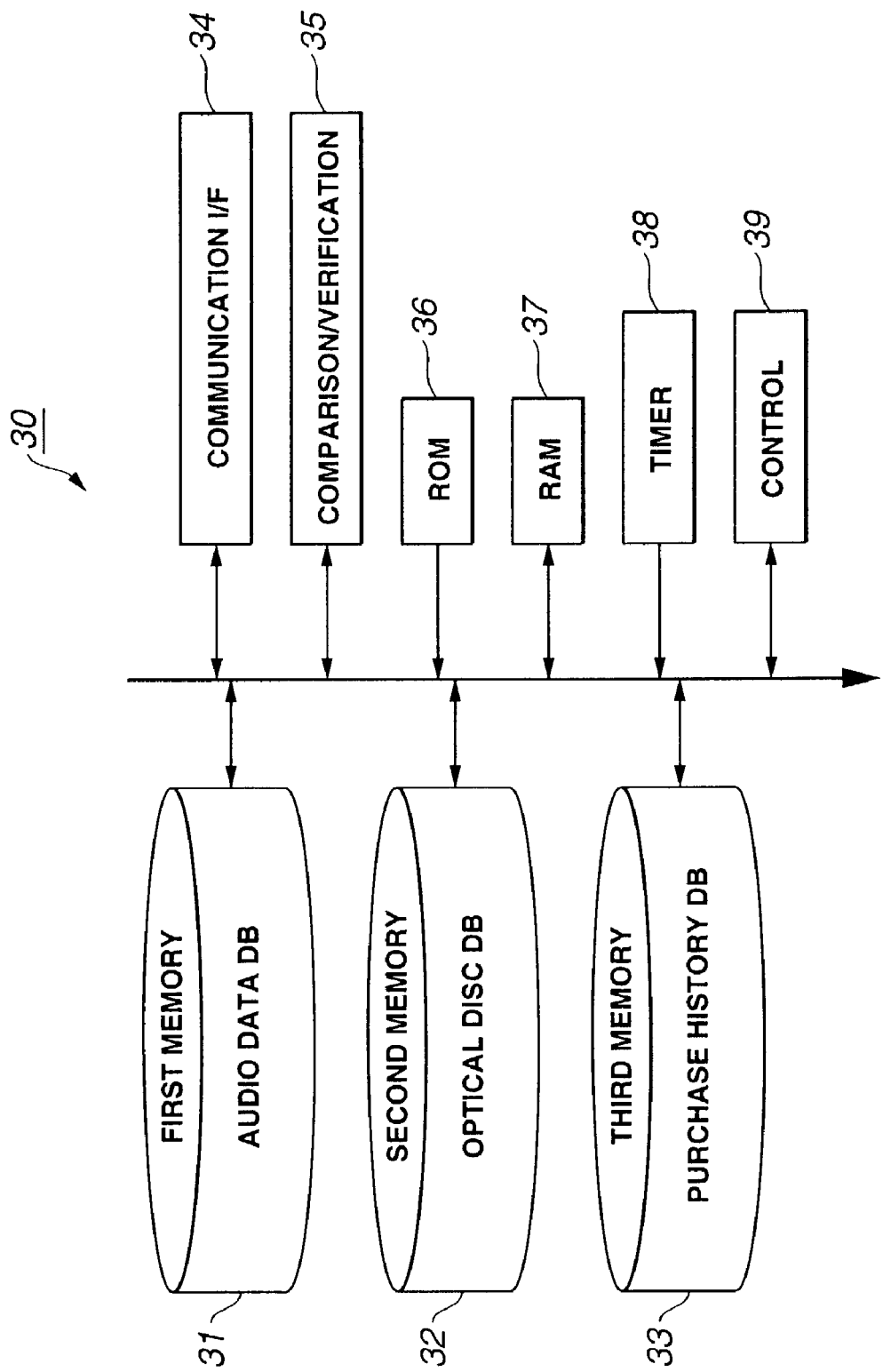
FIG. 5 is a schematic block diagram of a server apparatus that can be used for electronic music delivery.

As shown in FIG. 5, the server apparatus 30 that electronically distributes music comprises a first memory section 31 where a plurality of audio data are accumulated for the purpose of electronic music distribution, a second memory section 32 storing the recording media IDs of the package media 2 that are on sale in retail shops, a third memory section 33 storing the purchase history of the package media 2, a communication I/F 34 to be used for transmitting data to and receiving data from the recording/reproduction apparatus 10 of user/customers and the terminals 50 of retail shops, a comparison/verification section 35 for comparing each of the recording media IDs transmitted from the recording/reproduction apparatus 10 of users/customers and the terminals 50 of retail shops with the corresponding recording media ID recorded in the second memory section 32 for the purpose of verification, a read only memory (to be referred to simply as ROM hereinafter) 36, a random access memory (to be referred to simply as RAM hereinafter) 37 to which programs stored in the ROM 36 will be downloaded, a timer 38 for checking if a predetermined period of time has passed or not and a control section 39 for controlling the overall operation of the apparatus according to the program downloaded to the RAM 37.

The first memory section 31 typically comprises a large capacity hard disc, which stores a plurality of audio data to be used for electronic music distribution. The data base formed in the first memory section 31 for audio data will be described in greater detail below. The data base is configured in a manner as illustrated in Table 1 below.

TABLE 1

| artist name | AAA | BBB | CCC | ... |
|---|---|---|---|---|
| tune title | a | e | i | . |
| | b | f | j | . |
| | c | g | k | . |
| | d | h | l | . |
| | . | . | . | . |
| | . | . | . | . |
| | . | . | . | . |

As shown in Table 1, the audio data, or tunes, of each artist are sorted in the data base formed in the first memory section 31. For example, audio data, or tunes, "a", "b", "c", "d" are related to artist AAA and audio data, or tunes, "e", "f", "g", "h" are related to artist BBB.

The data base may alternatively be configured in a manner as illustrated in Table 2 below.

TABLE 2

| genre | lock | | jazz | |
|---|---|---|---|---|
| artist name | AAA | BBB | CCC | ... |
| tune title | a | e | i | . |
| | b | f | j | . |
| | C | g | k | . |
| | d | h | l | . |
| | . | . | . | . |
| | . | . | . | . |
| | . | . | . | . |

As shown in Table 2, artists are sorted into genres and the audio data, or tunes, of each artist are sorted in the data base formed in the first memory section 31.

For example, artist AAA and BBB are sorted as lock artist and artist CCC is sorted as jazz artist. Then, audio data, or tunes, "a", "b", "c", "d" are related to lock artist "AAA".

Like the first memory section 31, the second memory section 32 also comprises a large capacity hard disc, which stores data of package media 2, or optical discs 4. The data of package media 2 are sorted by referring to the record companies selling them as shown in Table 3 below.

TABLE 3

| record company ID | recording media ID | album title | release date |
|---|---|---|---|
| ABC | A1234 | KAKIKUKEKO | 14.07.2000 |
| DEF | D5678 | SASISUSESO | 07.06.2000 |
| GHI | G9012 | TATITUTETO | 01.01.2001 |
| . | . | . | . |
| . | . | . | . |
| . | . | . | . |

For example, recording media ID "A1234" and release date "14.07.2000" related to record company ID "ABC" and stored in the data base. Similarly, recording media ID "D5678" and release date "07.06.2000" are related to record company ID "DEF" and stored in the data base. While record companies that are not providing any electronic music distribution service may be included, only those providing electronic music distribution services and related record companies are stored in the above instance.

Like the first and second memory sections 31, 32, the third memory section 33 also comprises a large capacity hard disc, which stores the number of package media 2 purchased by each purchaser (user/customer). The third memory section 33 also stores the fee to be charged to each purchaser (user/customer) for electronic music distribution that is a function of the number of package media 2 purchased by the user/customer in the past. The purchase history of package media 2 stored in the data base of the third memory section 33 will be specifically described by referring to Table 4 below.

TABLE 4

| purchaser ID (user/customer) ID | No. of purchased package media | discount flag | billing data |
|---|---|---|---|
| OPQ | 10 | 10 | ¥1,000 |
| RST | 20 | 10 | ¥1,000 |
| UVW | 30 | 11 | ¥0 |
| XYZ | 0 | 0 | ¥2,000 |
| . | . | . | . |
| . | . | . | . |
| . | . | . | . |

As shown in Table 4 above, the number of purchased package media, a discount flag and a billing data are related to each purchaser (user/customer) in the data base formed in the third memory section 33. For example, the basic fee for the electronic music distribution service is ¥2,000 per month and no discount is made to purchasers who have purchased 0 to 9 package media 2 and therefore the discount flag is "00" for them, whereas a discount of ¥1,000 is made to purchasers who have purchased 10 to 29 package media 2 and therefore the discount fag is "10" for them. Similarly, a free electronic music distribution service is provided to purchaser who have purchased 30 or more than 30 package media 2 and therefore the discount flat is "11" for them.

Thus, since the purchaser (user/customer) with ID "XYZ" has purchased 0 package media, his or her discount flag is "00", indicating that he or she is not entitled to any discount, and the billing data is ¥2,000. Similarly, since the purchasers (users/customers) with IDs "OPQ" and "RST" have purchased 10 and 20 package media respectively, their discount flags are equally "10", indicating that they are entitled to a discount of ¥1,000, and their billing data are equally ¥1,000. Finally, since the purchaser (user/customer) with ID "UVW" has purchased 30 package media, his or her discount flag is "11" and the billing data is ¥0.

Only the number of purchased package media is entered into the purchaser (user/customer) ID column for any purchaser (user/customer) who has not concluded an agreement for the electronic music distribution service yet and both the discount flag column and the billing data column are left blank for him/her. Then, the server apparatus 30 can easily make advertisement to such purchasers (users/customers) for the electronic music distribution service. It may be so arranged that a discount service is also provided to purchasers (users/customers) who do not subscribe for the electronic music distribution service and pays for each recording or reproduction of contents data, using a recording/reproduction apparatus 10.

The communication I/F 34 is an interface to be used for communications with the recording/reproduction apparatus 10 of users/customers and the terminals 50 of retail shops by way of Internet 3. More specifically, the communication I/F 34 receives users/customers IDs and recording media IDs from recording/reproduction apparatus 10 and transmits audio data to recording/reproduction apparatus 10. The communication I/F 34 also receives purchasers (users/customers) IDs and recording media IDs from the terminals 50 of retail shops. Additionally, the communication I/F 34 transmits the billing data of each user/customer ID to the billing server apparatus 60.

Upon receiving a purchaser (user/customer) ID and one or more than one recording media IDs from a recording/reproduction apparatus 10 or the terminal 50 of a retail shop, the comparison/verification section 35 firstly determines if the third memory section 33 stores the purchaser (user/customer) ID or not and, if it the section 33 does not stores the ID, it adds the purchaser (user/customer) ID it has received to the third memory section. Then, the comparison/verification section 35 determines if each of the recording media IDs transmitted from the recording/reproduction apparatus 10 or the terminal 50, whichever appropriate, is found in the recording media IDs stored in the second memory section 32. If the recording media ID is stored in the data base of the second memory section 32, the comparison/verification section 35 increments the figure in the number of purchased recording media column of the purchaser (user/customer). Then, the comparison/verification section 35 updates the billing data and the discount data according to the updated number of purchased recording media.

The timer 38 checks if a predetermined period of time has passed or not for each user/customer (purchaser) ID. Since the electronic music distribution service is billed on a monthly basis, the predetermined period of time is a month.

When the server apparatus 30 having the above described configuration receives an audio data selection signal from a recording/reproduction apparatus 10, the control section 39 transmits the audio data that corresponds to the selection signal and is stored in the first memory section 31 to the recording/reproduction apparatus 10 by way of the communication I/F 34.

Additionally, when the server apparatus 30 receives a purchaser (user/customer) ID who purchased a package media 2 from a recording/reproduction apparatus 10 or the terminal 50 of a retail shop, the control section 39 refers to the recording media IDs stored in the above described data base of the second memory section 32 and updates the purchase history of the purchaser (user/customer) ID stored in the third memory section 33.

Furthermore, the control section 39 transmits billing data to the billing center in order to collect the fee for the electronic music distribution service from each of the subscribers when a predetermined period of time, e.g., 1 month, has elapsed.

Figure 6:
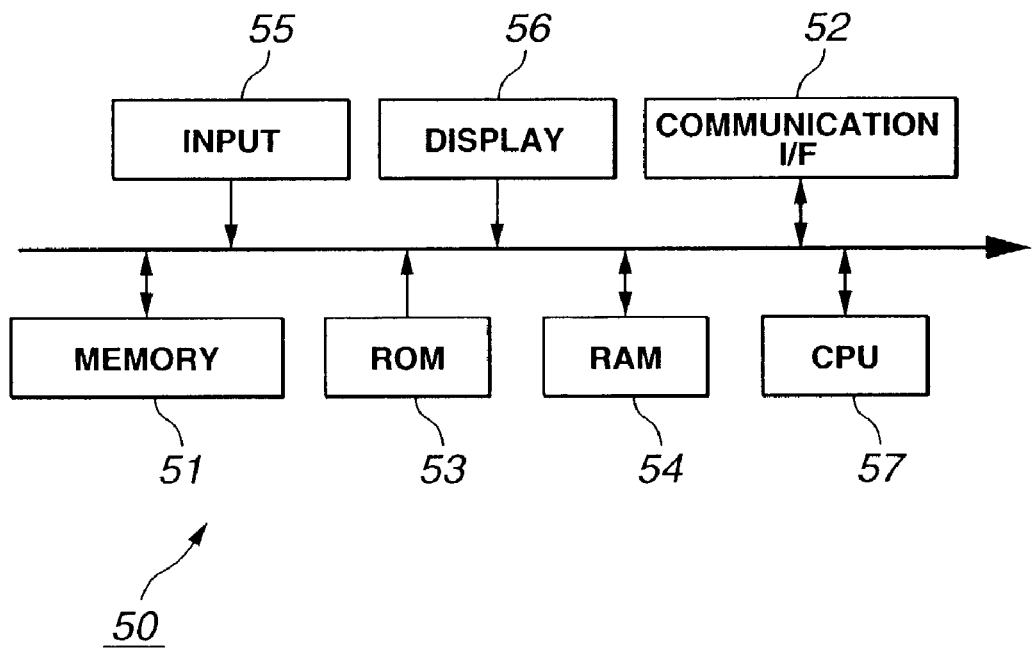
FIG. 6 is a schematic block diagram of a terminal that can be installed in a retail shop of package media.

Now, the terminal 50 installed in each of the retail shops of package media 2 will be described by referring to FIG. 6. The terminal 50 is designed to operate like a personal computer and comprises a memory section 51 storing application programs such as an electronic mail program and a data base typically storing a customer list, a communication I/F 52 for transmitting data to and receiving data from the server apparatus 30, a ROM 53 storing a control program for controlling the overall operation of the terminal and other data, a RAM 54 for temporarily storing the control program read out from the ROM 53 and other data, an input operation section 55 that typically includes a keyboard and a mouse, a display section 56 for displaying the home page of the server apparatus 30 when accessing the latter and a CPU (central processing unit) 57 for controlling the overall operation of the terminal according to the program stored in the memory section 51 and the ROM 53.

When a user/customer purchases a desired package media 2 at a retail shop of package media 2, the shop person inputs the purchaser (user/customer) ID of the purchaser and the recording media ID of the package media 2 by operating the input operation section 55. Then, as the URL for accessing the server apparatus 30 is input by way of the input operation section 55, the transmission protocol such as TCP/IP is executed in the terminal 50 and the purchaser (user/customer) ID and the recording media ID are transmitted from the terminal 50 to the server apparatus 30.

Figure 7:
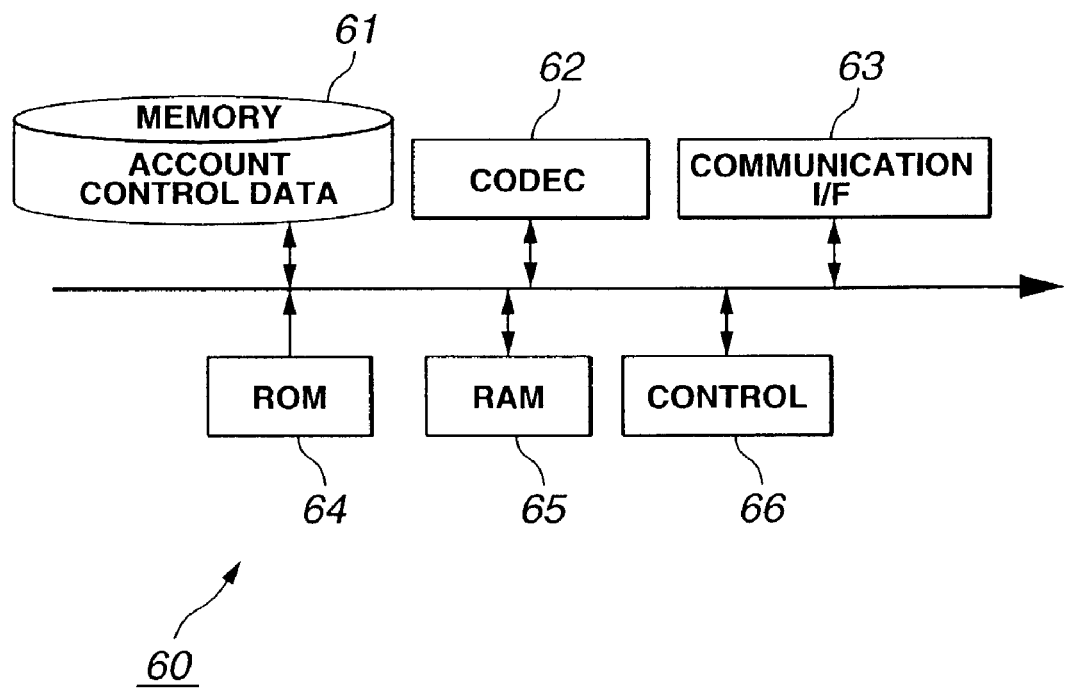
FIG. 7 is a schematic block diagram of a billing server apparatus.

Now, the billing server apparatus 60 that performs a billing operation for the user/customer who has downloaded an audio data from the server apparatus 30 will be described by referring to FIG. 7. As shown in FIG. 7, the billing server apparatus 60 comprises a memory section 61 storing the account data of the subscribers receiving the electronic music distribution service, a codec 62 for coding and decoding data, a communication I/F 63 for transmitting billing data to and receiving billing data from the server apparatus 30, a ROM 64 storing a control program for controlling the entire operation of the billing server apparatus 60 and other programs, a RAM 65 that is temporarily loaded with a program stored in the ROM 64 and a control section 66 for controlling the overall operation of the apparatus. When the billing server apparatus 60 receives billing data from the server apparatus 30, it operates for settlement of accounts by updating the account data of the users/customers of the electronic music distribution service.

Now, the sequence of operation that is followed from the time when a user/customer purchases a desired package media 2 at a retail shop and the retail shop transmits the purchaser ID and the recording media ID of the package media 2 to the server apparatus 30 to the time when the IDs are registered in the server apparatus 30 will be described by referring to FIG. 8.

Figure 8:
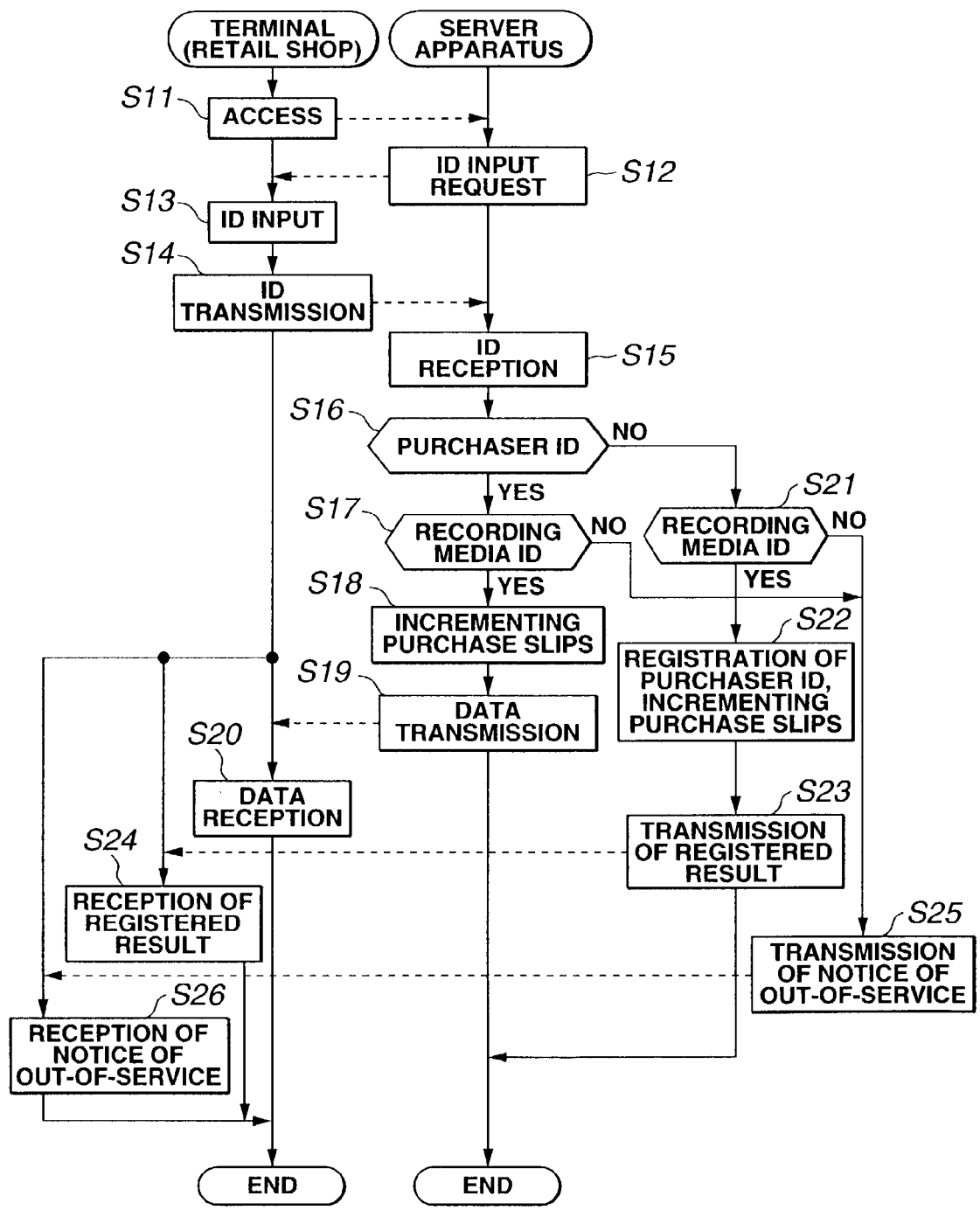
FIG. 8 is a flow chart of the sequence of operation that is followed from the time when a user/customer purchases a desired package media at a retail shop and the retail shop transmits the purchaser ID and the recording media ID to the server apparatus to the time when the IDs are registered in the server apparatus.

Referring to FIG. 8, firstly, as the user/customer purchases a package media 2 at the retail shop, the shop person inputs the URL of the server apparatus 30 by operating the input operation section 55 so as to make the terminal 50 access to the server apparatus 30 in Step S11. Then, in Step S12, upon receiving the access request from the terminal 50, the server apparatus 30 transmits an input request to the terminal 50 for inputting the purchaser (user/customer) ID of the purchaser of the package media 2 and the recording media ID of the package media 2.

As the terminal 50 receives the input request for the purchaser (user/customer) ID and the recording media ID from the server apparatus 30, the terminal 50 firstly displays an image to be used for inputting the purchaser (user/customer) ID and the recording media ID on the display section 56. Then, in Step S13, the shop person of the retail shop indicates the column for inputting the purchaser (user/customer) ID and the recording media ID typically by means of the mouse of the input operation section 55 and then actually inputs the purchaser (user/customer) ID and the recording media ID by means of the keyboard. In Step S14, as the shop person operates the terminal 50 for the purpose of transmitting these data, the terminal 50 executes the transmission protocol that may be TCP/IP and actually transmits the purchaser (user/customer) ID and the recording media ID to the server apparatus 30.

Then, as shown in FIG. 5, as the server apparatus 30 receives the purchaser (user/customer) ID and the recording media ID from the terminal 50 in Step S15, the control section 39 causes the comparison/verification section 35 to operate in Step S16. The comparison/verification section 35 checks if the purchaser (user/customer) ID transmitted from the terminal 50 is found in the purchase history data base formed in the third memory section 33 or not. If the purchaser (user/customer) ID transmitted from the terminal 50 is found in the purchase history data base in the third memory section 33, the comparison/verification section 35 determines that the purchaser of the package media 2 is a registered purchaser who has purchased package media 2 before and proceeds to Step S17. If, on the other hand, the purchaser (user/customer) ID transmitted from the terminal 50 is not found in the purchase history data base in the third memory section 33, the comparison/verification section 35 determines that the purchaser of the package media 2 purchased a package media 2 for the first time and proceeds to Step S21.

In Step S17, the comparison/verification section 35 determines if the recording media ID transmitted from the terminal 50 is found in the recording media ID data base formed in the second memory section 32 or not. In other words, the comparison/verification section 35 determines if the package media 2 purchased by the purchaser is an object covered by the electronic music distribution service or not in ibis step. If the recording media ID transmitted from the terminal 50 is found in the recording medium ID data base, the comparison/verification section 35 proceeds to Step S18 because the package media 2 purchased by the purchaser is covered by the distribution service. If, on the other hand, the recording media ID transmitted from the terminal 50 is not found in the recording medium ID data base, the comparison/verification section 35 proceeds to Step S25 because the object is not covered by the electronic music distribution service.

In Step S18, the comparison/verification section 35 increments the number of package media 2 in the column of the number of purchased package media of the purchaser (user/customer) ID registered in the purchase history data base in the third memory section 33 by the number of the package media 2 newly purchased in the retail shop. Then, the comparison/verification section 35 updates the discount flag and the billing data in the purchase history data base formed in the third memory section 33 on the basis of the increment. Then, the comparison/verification section 35 detects the discount flag of the purchaser (user/customer) ID in question and generates a billing data that is used when the purchaser of the package media 2 receives the electronic music distribution service next time. More specifically, the comparison/verification section 35 determines if the billing data of the purchaser having the purchaser (user/customer) ID transmitted from the terminal 50 corresponds to free, ¥1,000 or ¥2,000.

In Step S19, the server apparatus 30 transmits the billing data that reflects the fact that the purchaser (user/customer) ID transmitted from the terminal 50 has already been registered in the server apparatus 30 and hence is covered by the electronic music distribution service and the updated data including the total number of package media 2 that have been purchased by the purchaser to the terminal 50. In Step S20, the terminal receives the updating information from the server apparatus 30. As a result, the shop person of the retail shop selling package media 2 can notify the purchaser of the package media 2 of the updated data. Thus, the purchaser of the package media 2 who has been notified of the updated data can know the bill that will be issued to him or her when the purchaser receives the electronic music distribution service.

If the comparison/verification section 35 determines in the above described Step S16 that the purchaser (user/customer) ID transmitted from the terminal 50 is not found in the purchase history data base in the third memory section 33, the section 35 then determines in Step S21 if the recording media ID transmitted from the terminal 50 is found in the recording media ID data base formed in the second memory section 32 or not as in Step S17. In other words, the comparison/verification section 35 determines if the package media 2 purchased by the purchaser is an object covered by the electronic music distribution service or not in this step. If the recording media ID transmitted from the terminal 50 is found in the data base, the comparison/verification section 35 proceeds to Step S22 because the package media 2 purchased by the purchaser is covered by the electronic music distribution service. If, on the other hand, the recording media ID transmitted from the terminal 50 is not found in the recording medium ID data base, the comparison/verification section 35 proceeds to Step S25 because the object is not covered by the electronic music distribution service.

In Step S22, the comparison/verification section 35 newly registers the purchaser (user/customer) ID transmitted from the terminal 50 in the purchase history data base formed in the third memory section 33 and increments the number of package media 2 in the column of the number of purchased package media 2 of the purchaser (user/customer) ID by the number of the package media 2 newly purchased in the retail shop. Then, the comparison/verification section 35 updates the discount flag and the billing data in the purchase history data base formed in the third memory section 33 on the basis of the increment. Then, the comparison/verification section 35 detects the discount flag of the purchaser (user/customer) ID in question and generates a billing data that is used when the purchaser of the package media 2 receives the electronic music distribution service. More specifically, the comparison/verification section 35 determines if the billing data of the purchaser having the purchaser (user/customer) ID transmitted from the terminal 50 corresponds to free, ¥1,000 or ¥2,000.

In Step S23, the server apparatus 30 newly registers the purchaser (user/customer) ID transmitted from the terminal 50 in the server apparatus 30 and transmits the billing data to be used for the purchaser (user/customer) when the latter receives the electronic music distribution service and the updated data including the total number of package media 2 that have been purchased by the purchaser to the terminal 50. In Step S24, the terminal 50 receives the updating information from the server apparatus 30. As a result, the shop person of the retail shop selling package media 2 can notify the purchaser of the package media 2 of the updated data. Thus, the purchaser of the package media 2 who has been notified of the updated data can know the bill that will be issued to him or her when the purchaser receives the electronic music distribution service.

If the comparison/verification section 35 determines in Step S17 and Step S21 that the recording media ID transmitted from the terminal 50 is not found in the data base and hence it is not covered by the electronic music distribution service, the server apparatus 30 transmits an out-of-service notice that the package media 2 is not covered by the distribution service to the terminal 50 ane hence to the purchaser in Step S25. In Step S26, the terminal 50 receives the out-of-service notice. As a result, the shop person of the retail shop of the package media 2 can notify the purchaser of the package media 2 that the latter is not covered by the distribution service and the purchaser of the package media 2 can know that he or she cannot get the benefit of discount by purchasing the package media 2 when receiving the electronic music distribution service.

Figure 9:
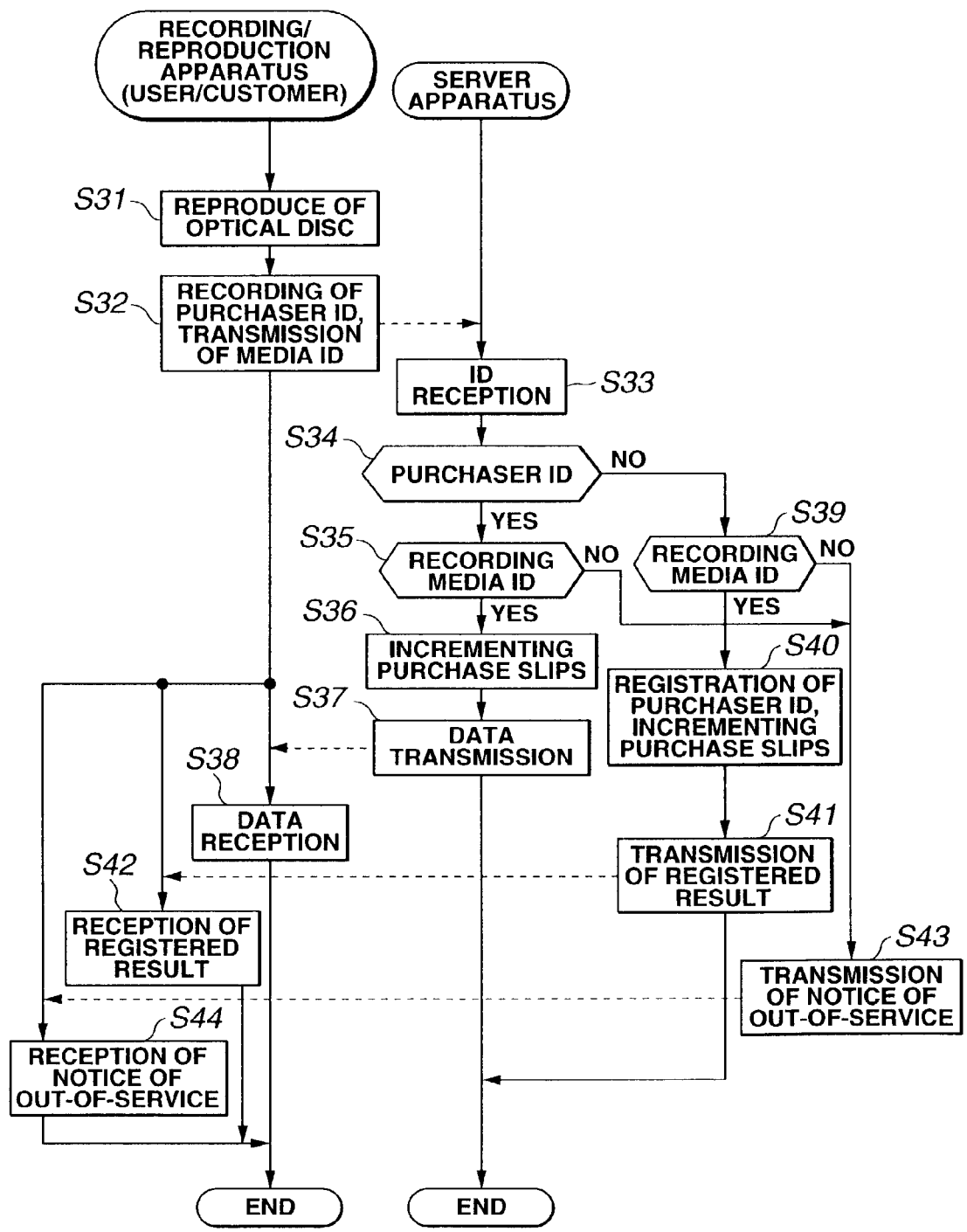
FIG. 9 is a flow chart of the sequence of operation that is followed from the time when a purchaser of a package media accesses the service apparatus by way of the recording/reproduction apparatus owned by purchaser to the time when the purchaser ID and the recording media ID are registered in the server apparatus.

Now, the sequence of operation that is followed when a user/customer who purchased a package media 2, which is an optical disc 4, in a retail shop, transmits the purchaser ID and the recording media ID from the recording/reproduction apparatus 10 owned by him- or herself to the server apparatus 30 and the IDs are registered in the server apparatus 30 will be described by referring to FIG. 9.

As the purchaser (user/customer) who purchased the package media 2 set the latter in position in the recording/reproduction apparatus 10 owned by him- or herself, the recording/reproduction apparatus 10 starts reproducing the optical disc 4 in Step S31. More specifically, as shown in FIG. 4, as the user/customer depresses the replay button of the input operation section 23, the optical disc 4 is driven to rotate to show a constant linear velocity by the motor 14. At the same time, the optical pickup 11 irradiates a light beam onto the signal recording surface of the optical disc 4. The light beam reflected by the signal recording surface of the optical disc 4 is converted into an electric signal by the photodetector, which photodetector outputs the electric signal to the RF circuit 12. Then, the RF circuit 12 generates an RF signal and outputs it to the demodulator 15, which demodulator 15 demodulates the input RF signal according to the EFM algorithm and outputs the demodulated signal to the error correction circuit 16. The error correction circuit 16 by turn performs an error correcting operation on the signal according to the CIRC algorithm and outputs the error-corrected signal to the memory section 21. As a result, the URL of the server apparatus 30 and the recording media ID recorded in the identification data recording region 4*d* of the optical disc 4 are temporarily stored in the memory section 21. Then, in Step S32, as the recording/reproduction apparatus 10 is operated by the user/customer to transmit the IDs, the recording/reproduction apparatus 10 executes the transmission protocol such as TCP/IP and transmits the recording media ID with the purchaser (user/customer) ID stored in the memory section 21 of the recording/reproduction apparatus 10 in advance to the server apparatus 10.

As the server apparatus 30 receives the purchaser (user/customer) ID and the recording media ID from the terminal 50 in Step S33, the control section 39 shown in FIG. 5 causes the comparison/verification section 35 to operates in Step S34. The comparison/verification section 35 checks if the purchaser (user/customer) ID transmitted from the recording/reproduction apparatus 10 is found in the purchase history data base formed in the third memory section 33 or not. If the purchaser (user/customer) ID transmitted from the recording/reproduction apparatus 10 is found in the purchase history data base in the third memory section 33, the comparison/verification section 35 determines that the purchaser is a registered purchaser who has purchased package media 2 before and proceeds to Step S35. If, on the other hand, the purchaser (user/customer) ID transmitted from the recording/reproduction apparatus 10 is not found in the purchase history data base in the third memory section 33, the comparison/verification section 35 determines that the purchaser of the package media 2 purchased a package media 2 for the first time and proceeds to Step S39.

In Step S35, the comparison/verification section 35 determines if the recording media ID transmitted from the recording/reproduction apparatus 10 is found in the recording media ID data base formed in the second memory section 32 or not. In other words, the comparison/verification section 35 determines if the package media 2 purchased by the purchaser is an object covered by the electronic music distribution service or not in this step. If the recording media ID transmitted from the recording/reproduction apparatus 10 is found in the recording medium ID data base, the comparison/verification section 35 proceeds to Step S36 because the package media 2 purchased by the purchaser is covered by the electronic music distribution service. If, on the other hand, the recording media ID transmitted from the recording/reproduction apparatus 10 is not found in the recording medium ID data base, the comparison/verification section 35 proceeds to Step S43 because the object is not covered by the electronic music distribution service.

In Step S36, the comparison/verification section 35 increments the number of purchased package media 2 of the user/customer ID registered in the purchase history of the third memory section 33. Then, the comparison/verification section 35 updates the discount flag and the billing data in the purchase history data base formed in the third memory section 33 according to the updated number of purchased package media 2. Thereafter, the comparison/verification section 35 detects the discount flag of the user/customer ID in question and generates a billing data that is used when the user/customer of the recording/reproduction apparatus 10 receives the electronic music distribution service. More specifically, the comparison/verification section 35 determines if the billing data of the user/customer having the user/customer ID transmitted from the recording/reproduction apparatus 10 corresponds to free, ¥1,000 or ¥2,000.

In Step S37, the server apparatus 30 transmits the billing data that is applicable when the user/customer ID transmitted from the recording/reproduction apparatus 10 has already been registered in the server apparatus 30 and receives the electronic music distribution service and the updated data including the total number of the purchased package media 2 to the recording/reproduction apparatus 10. In Step S38, the recording/reproduction apparatus 10 receives the update notification from the server apparatus 30. As a result, the user/customer can know the fee he or she should pay when he or she receives the electronic music distribution service.

If the comparison/verification section 35 determines in the above described Step S34 that the user/customer ID transmitted from the recording/reproduction apparatus 10 is not found in the data base, it proceeds to Step S39, where it determines if the recording media ID transmitted from the recording/reproduction apparatus 10 is found in the data base of recording IDs formed in the second memory section 32 or not as in Step S25. In other words, the comparison/verification section 35 determines if the package media 2 purchased by the user/customer is covered by the distribution service or not. If the recording media ID transmitted from the recording/reproduction apparatus 10 is found in the data base, the comparison/verification section 35 proceeds to Step S40 because the package media 2 purchased by the user/customer is covered by the distribution service. If, on the other hand, the recording media ID transmitted from the recording/reproduction apparatus 10 is not found in the data base, the comparison/verification section 35 proceeds to Step S43 because the package media 2 is not covered by the distribution service.

In Step S40, the comparison/verification section 35 newly registers the user/customer ID transmitted from the recording/reproduction apparatus 10 in the purchase history data base formed in the third memory section 33 and increments the number of package media 2 purchased by the user/customer ID. Then, the comparison/verification section 35 updates the discount flag and the billing data in the purchase history data base formed in the third memory section 33 according to the updated number of purchased package media 2. Thereafter, the comparison/verification section 35 detects the discount flag of the purchaser (user/customer) ID in question and generates a billing data that is used when the user/customer receives the electronic music distribution service. More specifically, the comparison/verification section 35 determines if the billing data of the user/customer having the user/customer ID transmitted from the recording/reproduction apparatus 10 corresponds to free, ¥1,000 or ¥2,000.

In Step S41, the server apparatus 30 newly registers the user/customer ID transmitted from the recording/reproduction apparatus 10 in the server apparatus 30 and transmits the billing data that is applicable when the user/customer receives the electronic music distribution service and the updated data including the total number of the purchased package media 2 to the recording/reproduction apparatus 10. In Step S42, the recording/reproduction apparatus 10 receives the update notification from the server apparatus 30. As a result, the user/customer can know the fee he or she should pay when he or she receives the electronic music distribution service.

If the comparison/verification section 35 determines in Step S35 and Step S39 that the recording media ID transmitted from the recording/reproduction apparatus 10 is not found in the data base and hence it is not covered by the electronic music distribution service, the server apparatus 30 transmits an out-of-service notice that the package media 2 purchased by the user/customer is not covered by the distribution service to the recording/reproduction apparatus 10 ane hence to the purchaser in Step S43. The recording/reproduction apparatus 10 receives the out-of-service notice from the server apparatus 30 in Step S44. As a result, the user/customer can know that he or she cannot get the benefit of discount by purchasing the package media 2 when receiving the electronic music distribution service.

Figure 10:
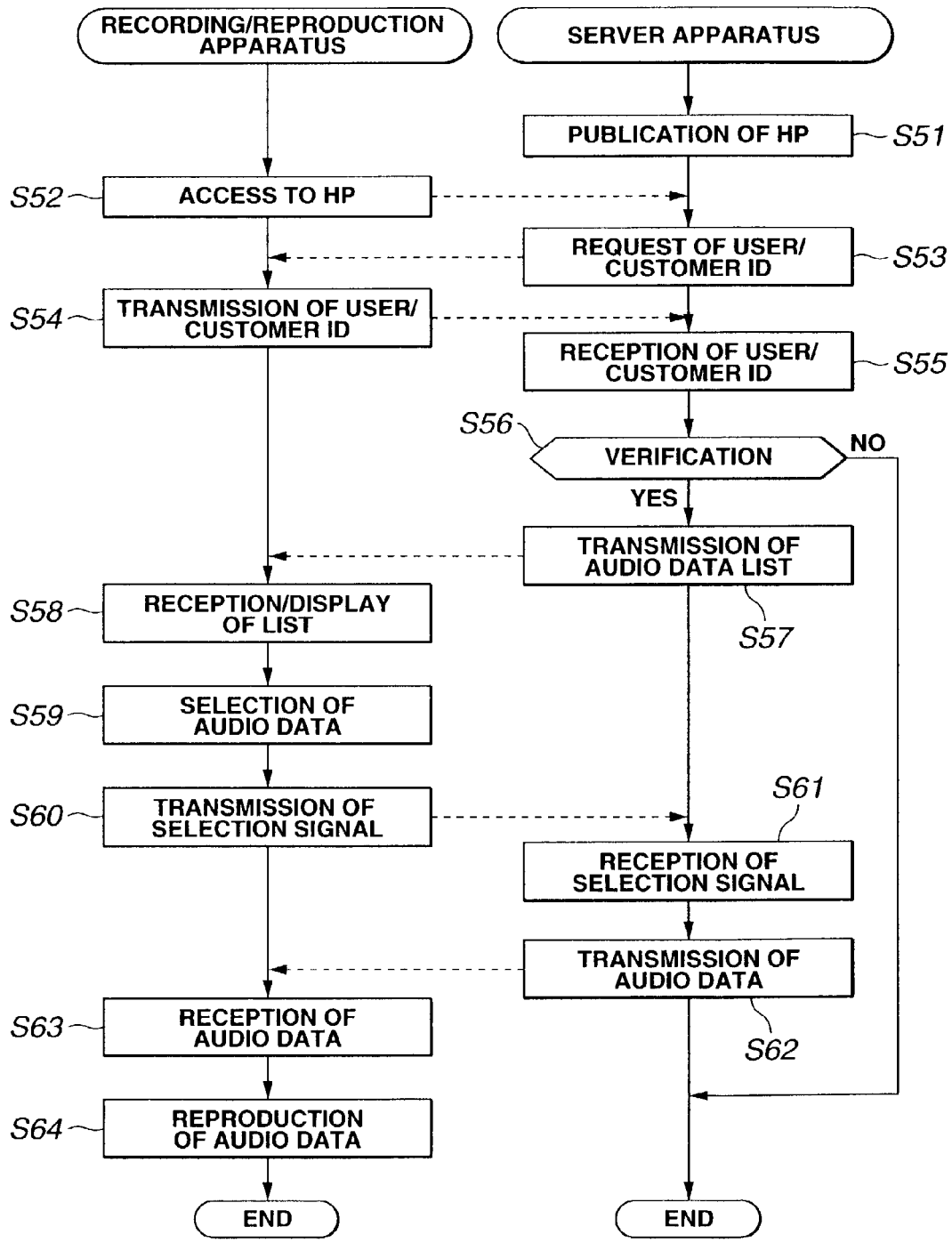
FIG. 10 is a flow chart of the sequence of operation that is followed from the time when a user/customer selects a desired audio data by the recording/reproduction apparatus owned by the user/customer to the time when the selected data is downloaded for electronic music delivery.

Now, the sequence of operation that is followed an audio data is downloaded by a recording/reproduction apparatus 10 from the server apparatus 30 to receive the electronic music distribution service will be described by referring to FIG. 10.

Firstly, in Step S51, the server apparatus 30 publishes a home page for the electronic music distribution service on Internet. In Step S52, a recording/reproduction apparatus 10 accesses the home page of the server apparatus 30 by using the URL recorded in the identification data recording region 4*d* of an optical disc 4 or acquired from a magazine or the like. In Step S53, as the server apparatus 30 receives an access request from the recording/reproduction apparatus 10, it by turn request the recording/reproduction apparatus 10 to input the user/customer ID. Upon receiving the input request from the server apparatus 30, the recording/reproduction apparatus 10 displays an image of the input request on the display section 24 in Step S54. Then, the recording/reproduction apparatus 10 transmits the user/customer ID stored in the memory section 21 of the recording/reproduction apparatus 10 automatically or in response to the manual operation of the user/customer.

As the server apparatus 30 that is in a standby state receives the user/customer ID from the recording/reproduction apparatus 10 in Step S55, it determines if the user/customer of the user/customer ID is a subscriber of the electronic music distribution service or not on the basis of the user/customer ID transmitted from the recording/reproduction apparatus 10 in Step S56. The server apparatus 30 proceeds to Step S57 when it is verified that the user/customer is a subscriber, whereas it terminates the processing operation when it is not verified that the user/customer is a subscriber.

In Step S57, the server apparatus 30 transmits a list of audio data that can be electronically distributed to the recording/reproduction apparatus 10. As the recording/reproduction apparatus 10 receives the list of audio data from the server apparatus 30 in Step S58, it displays the list on the display section 24.

The image displayed on the display section 24 shows tunes of each relevant artist as shown in FIG. 11A. For example, the titles of tunes "a", "b", "c", "d" are displayed for artist "AAA" as those the artist. Each title of tune is accompanied by a selection check box to be used for downloading. Note that, in the instance of FIG. 11A, the tune "b" of the artist "AAA" is selected. The displayed image also has a transmission button to be used to transmit a selection signal representing the selected audio data to the server apparatus 30.

An image as shown in FIG. 11B may alternatively be used. In the displayed image, artists are sorted into genres and the audio data, or tunes, of each artist of each genre are listed. For example, the titles of tunes "a", "b", "c", "d" are displayed for artist "AAA" as those the artist. A selection check box is provided to select the tune to be downloaded in each tune column. Note that, in the instance of FIG. 11A, the tune "d" of the artist "AAA" and the tune "j" of the artist "CCC" are selected. The displayed image also has a transmission button to be used to transmit a selection signal representing the selected audio data to the server apparatus 30.

In Step S59, the user/customer selects one or more than one audio data to be downloaded by operating the mouse and the keyboard of the input operation section 23. Assume here that the user/customer selects a single audio data. Then, as shown in FIGS. 11A and 11B, the user/customer selects the audio data by operating the input operation section 23 and checking the selection check box. As the transmission button is clicked by the user/customer operating the input operation section 23, the recording/reproduction apparatus 10 transmits a selection signal representing the title of the audio data to be downloaded that is selected by the user/customer to the server apparatus 30.

In Step S61, as the server apparatus 30 receives the selection signal from the recording/reproduction apparatus 10, it detects the audio data corresponding to the selection signal out of the plurality of audio data stored in the first memory section 31. Then, in Step S62, the server apparatus 30 transmits the audio data corresponding to the selection signal to the recording/reproduction apparatus 10. Note that the audio data that the server apparatus 30 transmits is a coded data.

As the recording/reproduction apparatus 10 that is in a standby state receives the audio data transmitted from the server apparatus 30, it stores the audio data in the memory section 21 and, in Step S64, the downloaded audio data is replayed in response to the operation of the user/customer. The replay operation of the recording/reproduction apparatus 10 will be described in greater detail below. As shown in FIG. 4, as the replay button is depressed, the control section 26 reads out the selected audio data from the memory section 21 and outputs to the decoder 17. The decoder 17 decodes the audio data by means of the decoding key it stores in advance and outputs the decoded audio data to the D/A converter 18. The D/A converter 18 converts the digital signal into an analog signal and outputs the analog signal to the loudspeaker 19. In this way, the user/customer can replay the audio data downloaded from the server apparatus 30.

Figure 12:
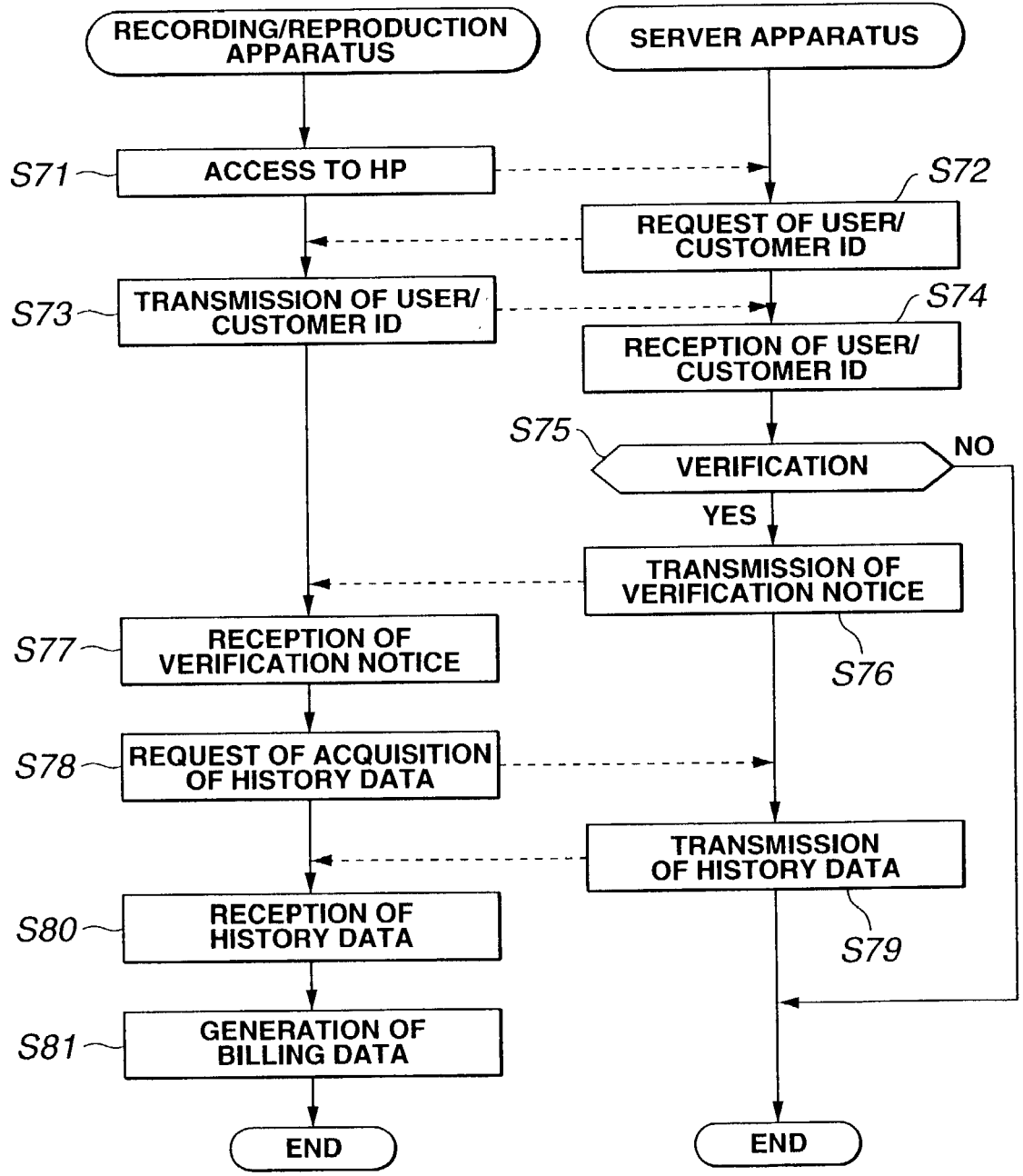
FIG. 12 is a flow chart of the sequence of operation that is followed when downloading purchase history from the server apparatus to the recording/reproduction apparatus.

Now, a billing operation that is executed by the recording/reproduction apparatus 10 each time an audio data is downloaded from the server apparatus 30 will be described by referring to FIG. 12.

Firstly, in Step S71, the recording/reproduction apparatus 10 accesses the home page of the server apparatus 30 by using the URL recorded in the identification data recording region 4d of the optical disc 4. Upon receiving the access request from the recording/reproduction apparatus 10, the server apparatus 30 requests the recording/reproduction apparatus 10 to input a user/customer ID in Step S72. Then, upon receiving the request for inputting the user/customer ID, the recording/reproduction apparatus 10 displays an image of the input request on the display section 24 and transmits the user/customer ID stored in the memory section 21 of the recording/reproduction apparatus 10 in advance automatically or in response to the manual operation of the user/customer in Step S73.

As the server apparatus 30 that is in a standby state receives the user/customer ID from the recording/reproduction apparatus 10 in Step S74, it determines if the user/customer of the user/customer ID is a subscriber of the electronic music distribution service or not on the basis of the user/customer ID transmitted from the recording/reproduction apparatus 10 in Step S75. The server apparatus 30 proceeds to Step S76 when it is verified that the user/customer is a subscriber, and transmits the verification notice to the recording/reproduction apparatus 10, whereas it terminates the processing operation when it is not verified that the user/customer is a subscriber.

In Step S77, as the recording/reproduction apparatus 10 that is in a standby state receives the notice of verification transmitted from the server apparatus 30, it then transmits a request for acquisition of the package media 2 purchase history of the user/customer him- or herself in Step S78. Then, upon receiving the request for acquisition of the purchase history of package media 2 from the recording/reproduction apparatus 10, the server apparatus 30 extracts the user/customer ID from the data base formed in the third memory section 33 and transmits the history data of the user/customer in Step S78. More specifically, the server apparatus 10 transmits the number of the purchased package media 2 as shown in Table 4 above. It may alternatively be so arranged that the server apparatus 30 transmits the discount flag that corresponds to the number of the purchased package media 2 along with the number of the purchased package media 2.

Upon receiving the history data transmitted from the server apparatus 30, the recording/reproduction apparatus 10 input it to the billing processing section 22 in Step S80. Then, the billing processing section 22 generates discount data that will be applicable when the user/customer downloads audio data on the basis of the number of the purchased package media 2.

Figure 13:
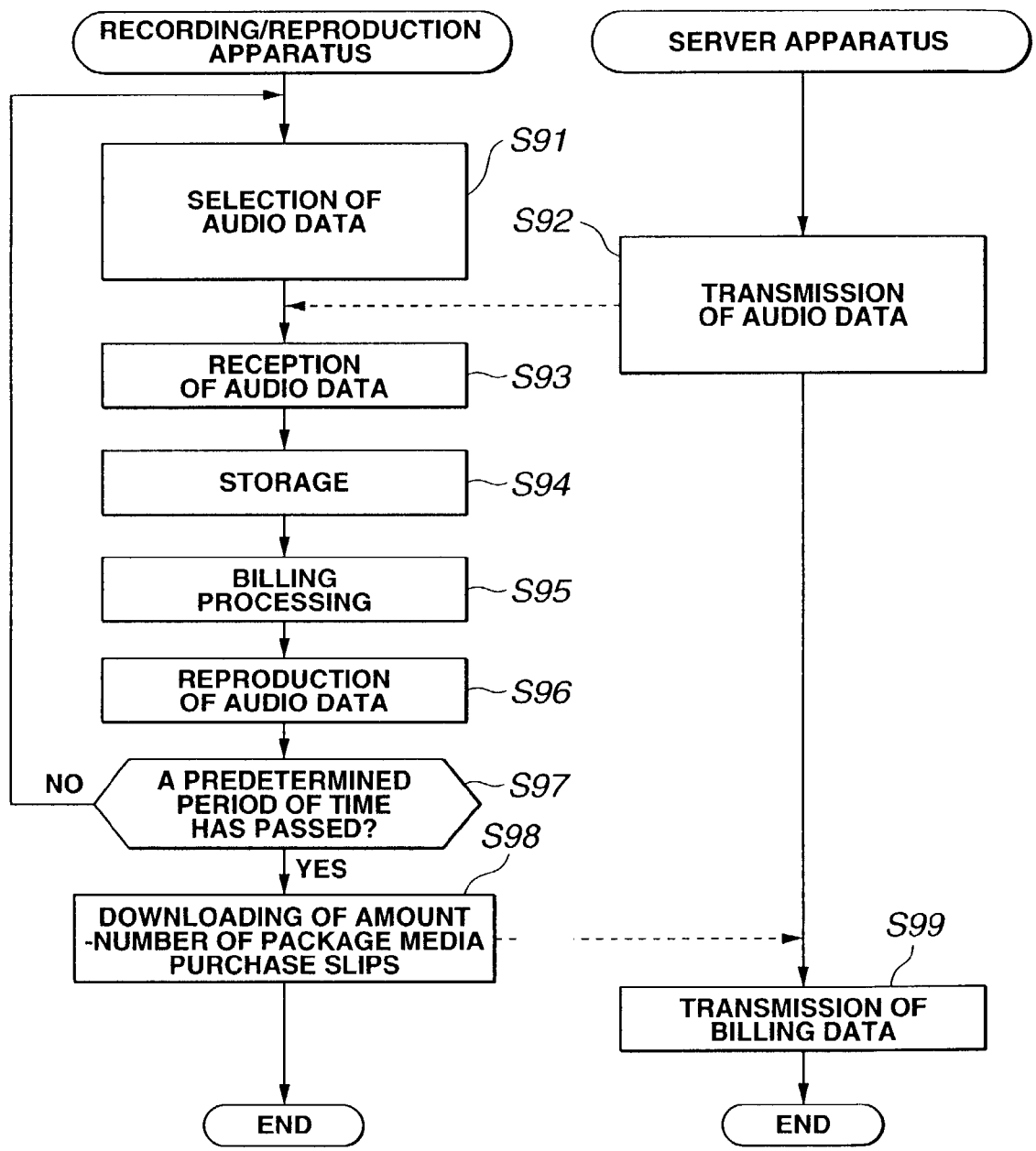
FIG. 13 is a flow chart illustrating a billing system that is operated when the audio data downloaded to the recording/reproduction apparatus is recorded.

Thereafter, the recording/reproduction apparatus 10 downloads the history data by following the flow chart of FIG. 12 and subsequently downloads the audio data from the server apparatus 30 in a manner as shown in FIG. 13.

Firstly, in Step S91, the recording/reproduction apparatus 10 selects one or more than one audio data to be downloaded from the server apparatus 30, executing the processing operations of Steps S52, S54, S58, S59 and S60. Then, in Step S92, the server apparatus 30 transmits the one or more than one audio data selected by the recording/reproduction apparatus 10 to the latter, executing the processing operations of Steps S51, S53, S55, S56, S57, S61 and S62.

Upon receiving the audio data transmitted from the server apparatus 30, the recording/reproduction apparatus 10 stores them in the memory section 11 in Step S93. Then, in Step S95, the billing processing section 22 of the recording/reproduction apparatus 10 counts the number of tunes of the audio data stored in the memory section 21. Thereafter, the billing processing section 22 bills the downloaded audio data at a rate of ¥100 per tune, for example, and stores the bill.

For reproducing one of the downloaded audio data in Step S96, the control section 26 reads the selected audio data from the memory section 21 and outputs it to the decoder 17. The decoder 17 decodes the audio data by means of the decoding key it stores in advance and outputs the decoded audio data to the D/A converter 18. The D/A converter 18 converts the digital signal into an analog signal and outputs the analog signal to the loudspeaker 19. In this way, the user/customer can replay the audio data downloaded from the server apparatus 30.

In Step S97, the recording/reproduction apparatus 10 determines if a predetermined period of time, which may for example a month, has passed or not. It proceeds to Step S98 if the predetermined period of time has passed, whereas it repeats the processing operations from Step S91 on if the predetermined period of time has not passed. In other words, the recording/reproduction apparatus 10 makes calculations to produce an amount of money as a function of the number of downloaded tunes on a monthly basis.

In Step S98, the recording/reproduction apparatus 10 transmits a billing data to the server apparatus 30. The billing data is obtained by deducting the amount to be discounted that is provided as a benefit of purchasing package media 2 from the amount of money obtained as a function of the number of downloaded tunes in the predetermined period of time. Then, in Step S99, the server apparatus 30 receives the billing data from the recording/reproduction apparatus 10. In this way, the management of the server apparatus 30 providing the electronic music distribution service can know the billing data on the user/customer.

Figure 18:
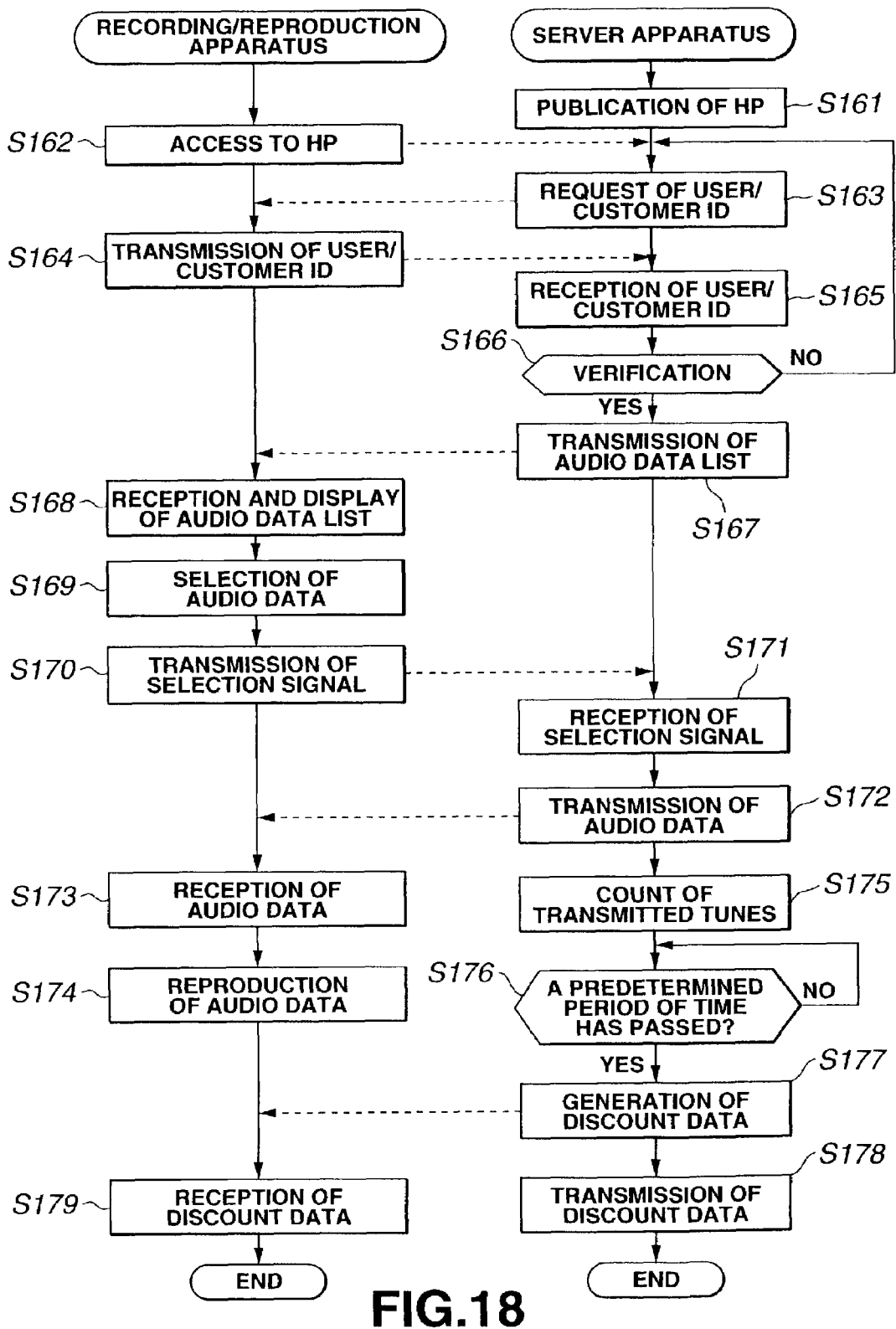
FIG. 18 is a flow chart illustrating a system for generating a discount data according to the frequency of use of the electronic music delivery system by the user/customer when the user/customer purchases a package media.

While the recording/reproduction apparatus 10 performs a billing operation each time a tune is downloaded in the instance of FIG. 13, it may alternatively be so arranged that the server apparatus 30 performs a billing operation each time a tune is downloaded as shown in FIG. 18.

Figure 14:
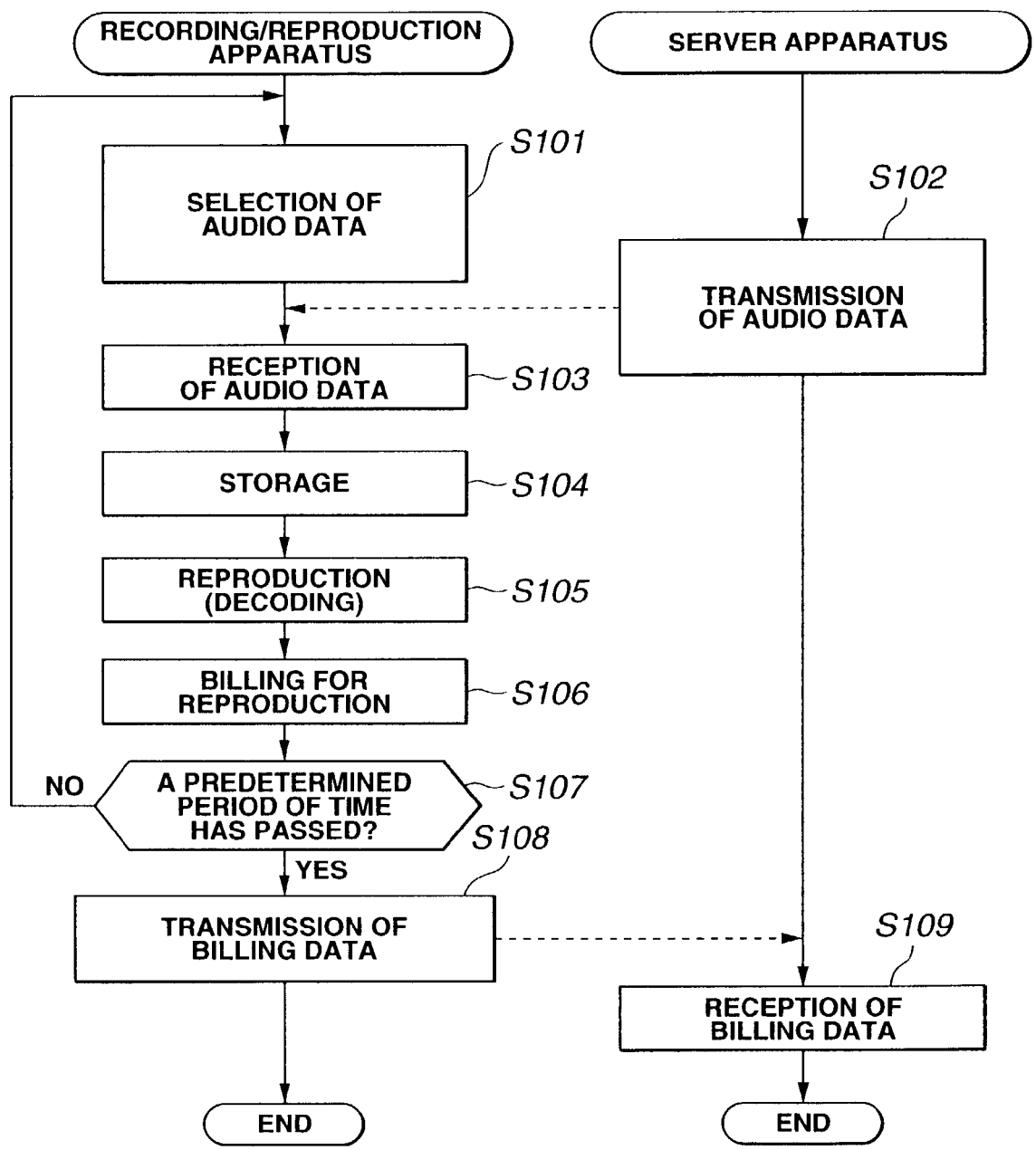
FIG. 14 is a flow chart illustrating a billing system adapted to charge according to the number of times of reproduction of the audio data downloaded to the recording/reproduction apparatus.

Additionally, while the audio data is downloaded to the recording/reproduction apparatus 10 and the billing operation is performed when the audio data is stored in the memory section 21 in the above description made by referring to FIG. 13, it may alternatively be so arranged that the recording/reproduction apparatus 10 performs a billing operation when the audio data is replayed as shown in FIG. 14.

Referring to FIG. 14, in Step S101, the recording/reproduction apparatus 10 firstly selects one or more than one audio data to be downloaded from the server apparatus 30, executing the processing operations of Steps S52, S54, S58, S59 and S60. Then, in Step S102, the server apparatus 30 transmits the one or more than one audio data selected by the recording/reproduction apparatus 10 to the latter, executing the processing operations of Steps S51, S53, S55, S56, S57, S61 and S62.

As the recording/reproduction apparatus 10 receives the audio data transmitted from the server apparatus 30 in Step S103, it stores them in the memory section 11 in Step S104. Then, in Step S105, as the replay button is depressed to replay one the downloaded audio data as shown in FIG. 4, the control section 26 reads the selected audio data from the memory section 21 and outputs it to the decoder 17. The decoder 17 decodes the audio data by means of the decoding key it stores in advance and outputs the decoded audio data to the D/A converter 18. The D/A converter 18 converts the digital signal into an analog signal and outputs the analog signal to the loudspeaker 19. In this way, the user/customer can replay the audio data downloaded from the server apparatus 30.

In Step S106, the billing processing section 22 of the recording/reproduction apparatus 10 counts the number of times by which the audio data is decoded by the decoder 17. Then, the billing processing section 22 bills the downloaded audio data at a rate of ¥100 per tune, for example, and stores the bill.

In Step S107, the recording/reproduction apparatus 10 determines if a predetermined period of time has elapsed or not and then proceeds to Step S108 if the predetermined period of time has elapsed, whereas it repeats the processing operations from Step S101 if the predetermined period of time has not elapsed.

In other words, the recording/reproduction apparatus 10 makes calculations to produce an amount of money as a function of the number of downloaded tunes on a basis of the predetermined period of time.

In Step S108, the recording/reproduction apparatus 10 transmits a billing data to the server apparatus 30. The billing data is obtained by deducting the amount to be discounted that is provided as a benefit of purchasing package media 2 from the amount of money obtained as a function of the number of downloaded tunes in the predetermined period of time. Then, in Step S109, the server apparatus 30 receives the billing data from the recording/reproduction apparatus 10. In this way, the management of the server apparatus 30 providing the electronic music distribution service can know the billing data on the user/customer.

While a billing operation is performed at the recording/reproduction apparatus 10 each time a downloaded audio data is decoded and replayed in the instance of FIG. 14, it may alternatively be so arranged that the recording/reproduction apparatus 10 obtains the decoding key to be used for decoding a downloaded audio data from the server apparatus 30 each time it replay the audio data and a billing operation is performed at the server apparatus 30 when the latter transmits the decoding key to the recording/reproduction apparatus 10.

Figure 15:
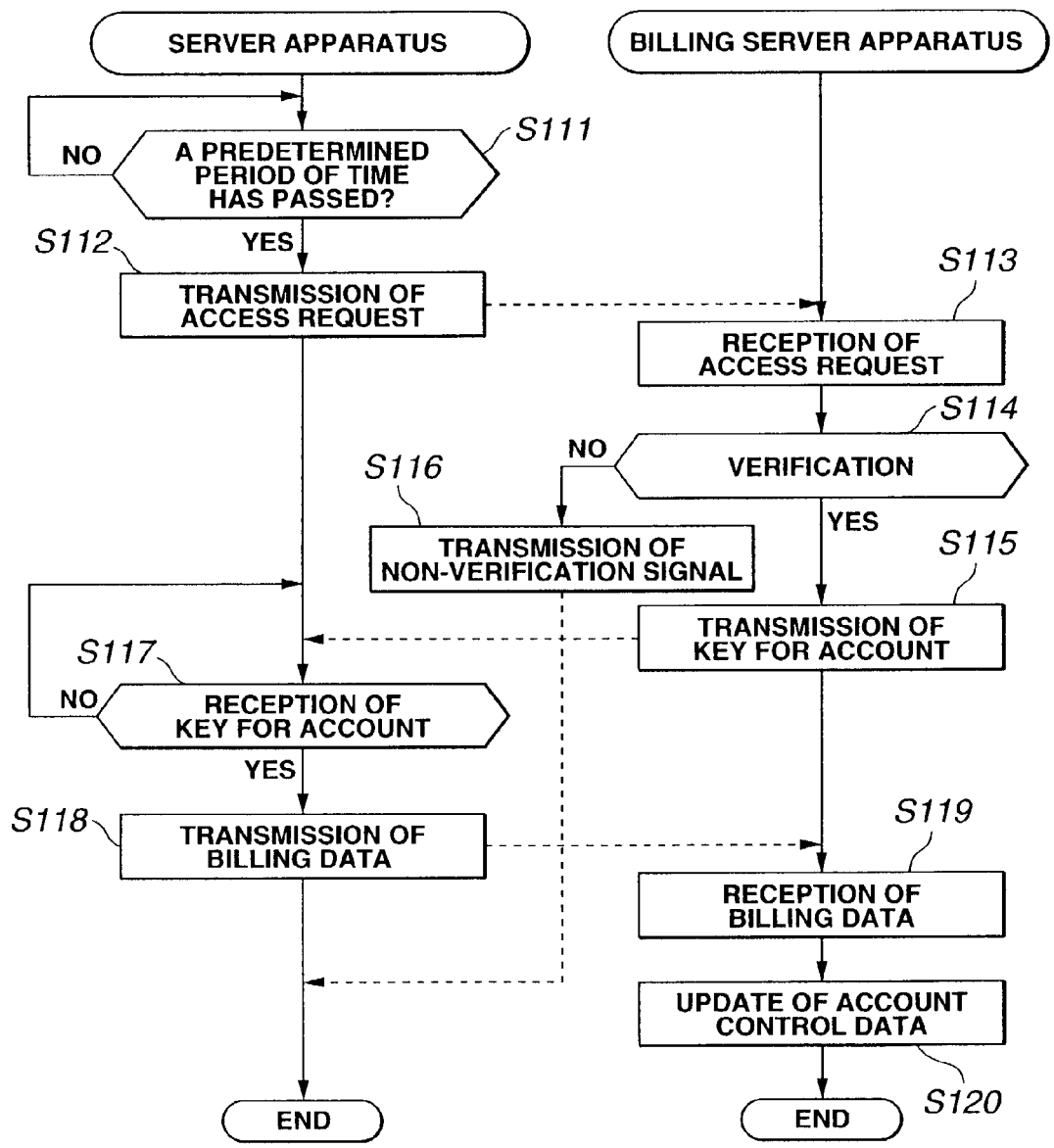
FIG. 15 is a flow chart illustrating a bill settlement processing method.

Now, the account settlement method used in the recording/reproduction system 1 having the above described configuration will be described by referring to FIG. 15.

The server apparatus 30 stores billing data for each user/customer who subscribed typically on a monthly subscription fee basis that reflects the amount to be discount, which by turn corresponds to the number of package media 2 purchased by the user/customer, in the third memory section 33. In the case where the billing system of discounting an amount corresponding to the number of purchased package media 2 from the charge for the number of tunes downloaded and stored in the memory section 21 of the recording/reproduction apparatus 10 as shown in FIG. 13 is adopted, the billing data transmitted from the recording/reproduction apparatus 10 is also stored in the memory section 33. Similarly, in the case where the billing system of discounting an amount corresponding to the number of purchased package media 2 from the charge for the number of replays as shown in FIG. 14 is adopted, the billing data transmitted from the recording/reproduction apparatus 10 is also stored in the memory section 33.

The server apparatus 30 determines if a predetermined period of time, e.g., a month, has passed or not in Step S111 and proceeds to Step S112 when a predetermined period of time has already passed, whereas it repeats the processing operation of Step S111 when a predetermined period of time has not passed. Then, in Step S112, the server apparatus 30 requests to access the billing server apparatus 60 with the server ID. As the billing server apparatus 60 that is in a standby state, waiting for an access request, receives the access request, it performs a verifying operation on the basis of the server ID transmitted from the server apparatus 30 in Step S113. The billing server apparatus 60 proceeds to Step S115 when the verifying operation is concluded successfully, whereas it proceeds to Step S116 when the verifying operation is not concluded successfully.

The user/customer who possesses a recording/reproduction apparatus 10 has specified an account for the service of this system and the billing server apparatus 60 stores a key for the user/customer that corresponds to the account. Therefore, when the verifying operation was concluded successfully, the billing server apparatus 60 transmits the key for the user/customer to the server apparatus 30 in Step S115.

If, on the other hand, the verifying operation was not concluded successfully in Step S114, the billing server apparatus 60 transmits a no-verification signal to the server apparatus 30 to notify the management of the server apparatus 30 and hence that of this system of the fact that the verifying operation was not concluded successfully and terminates the processing operation.

Then, the server apparatus 30 determines if it has received the key for the user or not in Step S117 and proceeds to Step S118 if it has received the key, whereas it repeats the processing operation of Step S117 if it has not received the key. Although not illustrated, it may be so arranged that the server apparatus 30 issues a request to the billing server apparatus for retransmitting the key for the account and repeats the processing operation of Step S117. In Step S118, the server apparatus 30 transmits the billing data of the user/customer to the billing server apparatus 60 along with the key for the user/customer.

As the billing server apparatus 60 that is in a standby state receives the key for the user/customer and the billing data from the server apparatus 30 in Step S119, it updates the data base including the data, the receipt/defrayal history and the balance on the basis of the billing data transmitted from the server apparatus 30 for the user/customer in Step S120.

More specifically, the billing server apparatus 60 reduces the balance of the account of the user/customer on the basis of the billing data transmitted from the server apparatus 30 and transfers the corresponding amount to the account of the management of the server apparatus 30.

With the data recording/reproduction system 1 having a configuration as described above, each user/customer becomes eligible for discounts when he or she subscribes for and receives the electronic music distribution service provided by the recording company on the basis of the number of package media 2 the user/customer has purchased so that the system encourages and motivates the purchasers of package media 2 who are potential subscribers to actually subscribe for the electronic music distribution service. Additionally, the system encourages and motivates the subscribers of the electronic music distribution service to purchase package media 2. Thus, the data recording/reproduction system 1 can activate both the marked of package media 2 and that of electronic music distribution services.

While billing operations are performed for the subscribers, or the users/customers, of an electronic music distribution service in the above described instance, the present invention can also be applied to a service system of distributing only to the users/customers who have purchased a package media 2 data relating to the package media 2 such as part of the newly released audio data of the artist of the package media 2, an article of interview with the artist, an image data of the artist and/or video data relating to the artist for free of charge.

Such a system will be described in greater detail by referring to the flow chart of FIG. 16. The recording/reproduction apparatus 10 firstly accesses the home page of the server apparatus 30 by using the URL recorded in the identification data recording region 4*d* of the optical disc 4 of the package media 2 purchased by the user/customer in Step S121. Upon receiving the access request from the recording/reproduction apparatus 10, the server apparatus 30 request the recording/reproduction apparatus 10 to input the user/customer ID and the recording media ID in Step S122. Upon receiving the input request from the server apparatus 30, the recording/reproduction apparatus 10 displays an image of the input request on the display section 24 and transmits the user/customer ID and the recording media ID stored in the memory section 21 of the recording/reproduction apparatus 10 in advance automatically or in response to the manual operation of the user/customer in Step S123.

As the server apparatus 30 that is in a standby state receives the user/customer ID from the recording/reproduction apparatus 10 in Step S124, it determines if the recording media ID transmitted from the recording/reproduction apparatus 10 is found in the data base for optical discs 4 in the second memory section 32 or not on the basis of the user/customer ID and the recording media ID transmitted from the recording/reproduction apparatus 10 and verify that the user/customer ID is found in the purchase history data base for package media 2 in the third memory section 33. In other words, in this step, the server apparatus 30 performs an operation of verifying that the data relating to the package media 2 is distributed only to the user/customer of the recording/reproduction apparatus 10 who has purchased a package media 2. Then, the server apparatus 30 proceeds to Step S126 and transmits the verification notice to the recording/reproduction apparatus 10 when the verifying operation is concluded successfully, whereas it terminates the processing operation so as not to transmit the data relating to the package media 2 to the recording/reproduction apparatus 10 when the verifying operation is not concluded successfully.

As the recording/reproduction apparatus 10 receives the notice of verification in Step S127, it transmits a request for downloading data relating to the package media 2 to the server apparatus 30 in Step S128. Upon receiving the downloading request, the server apparatus 30 subsequently transmits the data relating to the package media 2 to the recording/reproduction apparatus 10 in Step S129. In Step S130, the recording/reproduction apparatus 10 receives the data transmitted from the server apparatus 30 and stores it in the memory section 21. When the recording/reproduction apparatus 10 reproduces the downloaded data in Step S131, the control section 26 reads out the data from the memory section 21 in response to a manual operation of the input operation section 23 by the user/customer. When the data is an audio data, it is output to the decoder 17 if it is coded, whereas it is output to the D/A converter 18 if it is not coded. The data decoded by the decoder 17 is output to the D/A converter 18. The D/A converter 18 outputs the audio data input from the decoder 17 or the memory section 21 to the loudspeaker 19, which converts the electric signal into a sound by electro-acoustic conversion and outputs the sound. When, on the other hand, the downloaded data is an image data or a data of an interview article, the control section 26 displays the data on the display section 24. With the above described system, a special service can be provided to the users/customers who have purchased a package media 2 by controlling the purchase history of package media 2 in the server apparatus 30.

Figure 16:
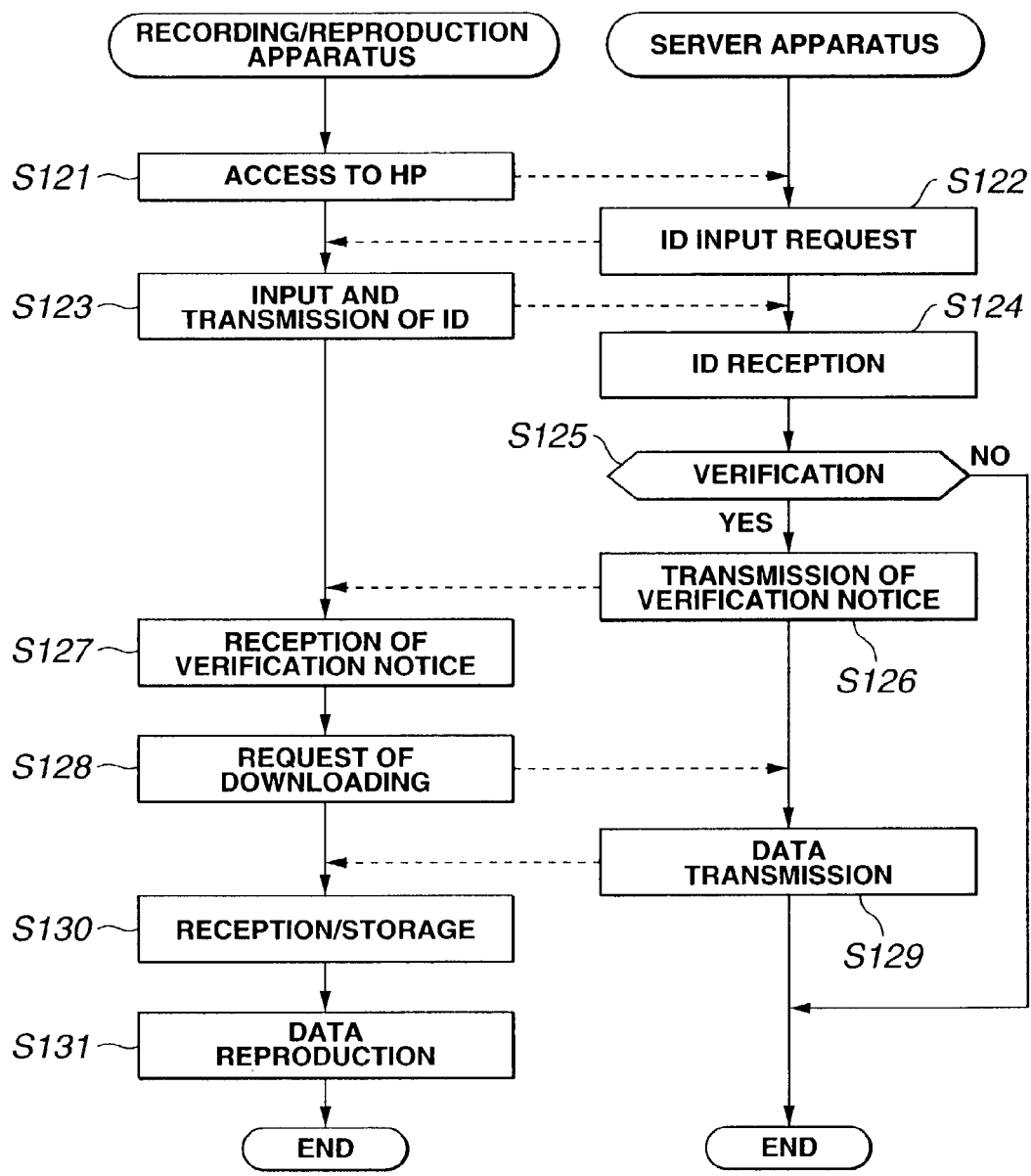
FIG. 16 is a flow chart illustrating a system for delivering data relating to a package media only to the purchaser of the package media.
Figure 17:
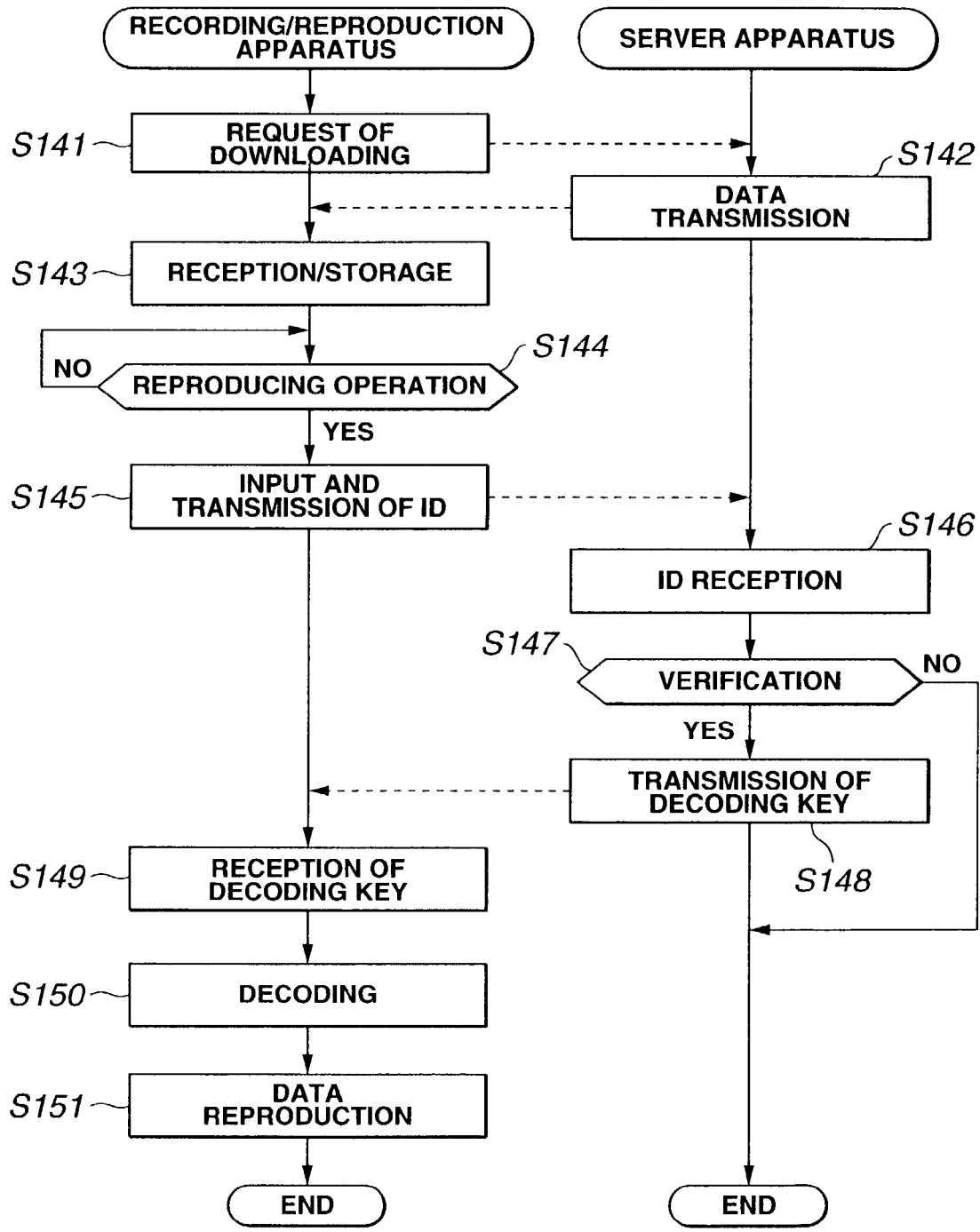
FIG. 17 is a flow chart illustrating another system for delivering data relating to a package media only to the purchaser of the package media.

While the operation of downloading data relating to package media 2 is restricted in the instance of FIG. 16, the operation of reproducing data may be restricted as shown in FIG. 17.

Referring to FIG. 17, the recording/reproduction apparatus 10 firstly accesses the home page of the server apparatus 30 by using the URL that may be shown in a magazine or the like in Step S141. Then, the recording/reproduction apparatus 10 selects a data relating to the package media 2 purchased by the user/customer and transmits a selection signal representing the selection to the server apparatus 30. Upon receiving the selection signal from the recording/reproduction apparatus 10, the server apparatus 30 encodes the data corresponding to the package media 2 in question and transmits it to the recording/reproduction apparatus 10 in Step S142. Then, as the recording/reproduction apparatus 10 receives the data relating to the package media 2 and transmitted from the server apparatus 30, it stores the data in the memory section 21 in Step S143.

Then, in Step S144, the recording/reproduction apparatus 10 determines if the data relating to the package media 2 is reproduced by the user/customer or not. The recording/reproduction apparatus 10 proceeds to Step S145 if the data is reproduced, whereas it repeats the operation of Step S144 if the data is not reproduced. In Step S145, the recording/reproduction apparatus 10 displays an image for inputting the recording media ID of the package media 2 and the user/customer ID on the display section 24. As the recording media ID and the user/customer ID are input by the user/customer, the recording/reproduction apparatus 10 transmits the input recording media ID and the user/customer ID to the server apparatus 30.

As the server apparatus 30 receives the recording media ID and the user/customer ID transmitted from the recording/reproduction apparatus 10 in Step S146, it determines if the recording media ID transmitted from the recording/reproduction apparatus 10 is found in the data base for optical discs 4 in the second memory section 32 or not on the basis of the user/customer ID and the recording media ID transmitted from the recording/reproduction apparatus 10 and performs an operation of verifying that the user/customer ID is found in the purchase history data base for package media 2 in the third memory section 33. In other words, in this step, the server apparatus 30 verifies that the data relating to the package media 2 is delivered only to the recording/reproduction apparatus 10 of the user/customer who has purchased a package media 2. Then, the server apparatus 30 proceeds to Step S148 when the verifying operation is concluded successfully and transmits the decoding key for the data relating to the package media 2 stored in the memory section 21 of the recording/reproduction apparatus 10 in a coded state. If, on the other hand, the verifying operation is not concluded successfully, the server apparatus 30 terminates the processing operation so as not to transmit the data relating to the package media 2 to the recording/reproduction apparatus 10.

The recording/reproduction apparatus 10 receives the decoding key transmitted from the server apparatus 30 in Step S149 and then proceeds to Step S150.

The recording/reproduction apparatus 10 operates the control section 26 so as to read out the data relating to the corresponding package media 2 from the memory section 21. Then, the control section 26 outputs the data to the decoder 17. In Step S150, the decoder 17 decodes the data by means of the decoding key transmitted from the server apparatus 30. If the decoded data is an audio data, the decoder 17 outputs it to the D/A converter 18, which D/A converter 18 then outputs it to the loudspeaker 19. In this way, the audio data of the new release is replayed. If the decoded data is an image data or the like, the decoder 17 outputs it to the display section 24 and the display section 24 displays the data. With a system having a configuration as described above, special services may be provided to users/customers who have purchased package media 2 by controlling the purchase history of package media 2 at the server apparatus 30.

The subscription fee of the electronic music distribution service is deducted on the basis of the purchase history of package media 2, or the number of purchased package media 2, of the user/customer of the electronic music distribution service in order to encourage and motivate the user/customer to buy more package media and use the electronic music distribution service more in the above description. However, according to the invention, it is possible to so arrange that the user/customer is encouraged and motivated to buy more package media 2 and utilize the electronic music distribution service more by generating a discount data to be used for the user/customer when he or she purchases a package media 2 on the basis of the frequency of use of the electronic music distribution service.

For instance, as shown in FIG. 18, firstly in Step S161, the server 30 publishes a home page for an electronic music distribution service on Internet 3. In Step S162, the recording/reproduction apparatus 10 accesses the home page of the server apparatus 30 by using the URL that may be shown on a magazine. Upon receiving the access request from the recording/reproduction apparatus 10, the server apparatus 30 issues a request for inputting the user/customer ID to the recording/reproduction apparatus 10 in Step S163. Upon receiving the input request from the server apparatus 30, the recording/reproduction apparatus 10 displays an image of the input request on the display section 24 in Step S164. Then, the recording/reproduction apparatus 10 transmits the user/customer ID registered in advance in the server apparatus 30 to the server apparatus 30 in response to a manual operation of the user/customer.

As the server 30 that is in a standby state receives the user/customer ID from the recording/reproduction apparatus 10 in Step S165, it determines if the user/customer is a subscriber for the electronic music distribution service or not on the basis of the user/customer ID transmitted from the recording/reproduction apparatus 10 in Step S166. The server apparatus 30 proceeds to Step S167 if it is verified that the user/customer is a subscriber, whereas it returns to Step S163 and issues a request for inputting the user/customer ID once again if it is not verified that the user/customer is a subscriber.

In Step S167, the server apparatus 30 transmits a list of audio data that can be distributed as the electronic music distribution service to the recording/reproduction apparatus 10. Upon receiving the list of audio data from the server apparatus 30, the recording/reproduction apparatus 10 displays it on the display section 24 in a manner as shown in FIGS. 11A and 11B in Step S168. Then, in Step S169, the user/customer selects the audio data to be downloaded by operating the mouse and/or the keyboard. As the transmission button is clicked by the user, using the input operation section 23, the recording/reproduction apparatus 10 transmits a selection signal representing the audio data that are selected by the user/customer for downloading to the server apparatus 30.

Upon receiving the selection signal from the recording/reproduction apparatus 10, the server apparatus 30 detects the audio data corresponding to the selection signal out of the plurality of audio data stored in the first memory section 31 in Step S171 and transmits the one or more than one audio data that correspond to the selection signal to the recording/reproduction apparatus 10 in Step S172.

The recording/reproduction apparatus 10 that is in a standby state receives the audio data transmitted from the server apparatus 30 and stores them in the memory section 21 in Step S173. Then, in Step S174, it replays the downloaded audio data in response to the manual operation of the user/customer.

On the other hand, the after transmitting the audio data to the recording/reproduction apparatus 10 in Step S172, the server apparatus 30 increments the number of tunes of the user/customer ID by the number of audio data transmitted this time in Step S175. Then, in Step S176, the server apparatus 30 determines if a predetermined period of time, e.g., a month, has passed or not. The server apparatus 30 proceeds to Step S177 if it is determined that the predetermined period of time has passed, whereas it repeats the operation of Step S176 if it is determined that the predetermined period of time has not passed.

Then, in Step S177, the server apparatus 30 performs a billing operation for each and every user/customer ID with regard to all the tunes downloaded to the user/customer during the predetermined period of time. In this step, the server apparatus 30 generates a discount data with which the discount rate that is applied when a user/customer purchases package media 2 increases as a function of the total number of tunes downloaded during the predetermined period of time. Then, in Step S178, the server apparatus 30 transmits the billing data and the discount data respectively to the billing server apparatus 60 and the recording/reproduction apparatus 10.

In Step S179, the recording/reproduction apparatus 10 receives the discount data from the server apparatus 30. As a result, the user/customer can know that he or she is eligible for discount when purchasing package media 2. For example, the user/customer may output the discount data onto a sheet of paper by means of a printer connected to the recording/reproduction apparatus 10 and produce it to a retail shop when he or she purchases package media 2 next time so that the user/customer can buy the package media 2 at a discount price.

In the above instance, the billing data and the discount data generated by the server apparatus 30 may alternatively be generated by the recording/reproduction apparatus 10 as shown in FIG. 13.

In the above description, the user/customer outputs the discount data transmitted from the server apparatus 30 to the recording/reproduction apparatus 10 on a sheet of paper and uses it as a discount coupon so that he or she can purchase package media 2 at a discount price by producing it to the retail shop of package media 2. However, it may alternatively be so arranged that the retail shop confirms the discount data of the user/customer who is buying package media 2.

This will be described by referring to FIG. 19. Assume that the user/customer visits the retail shop, selects package media 2 and pays the charge for the package media 2. The shop person of the retail shop inputs the URL of the server apparatus 30 by operating the input operation section 55 of the terminal 50 of the shop and inputs the URL in order to access the server apparatus 30 in Step S181. Then, upon receiving the access request from the terminal 50, the server apparatus 30 issues a request for inputting the retail shop ID of the retail shop of package media 2 that is registered in the server apparatus 30 in advance to the terminal 50 in Step S182.

Upon receiving the request for inputting the retail shop ID from the server apparatus 30, the terminal 50 displays an image for inputting the retail shop ID on the display section 56. Then, in Step S183, the shop person of the retail shop specifies the column for inputting the purchaser (user/customer) ID and the recording media ID by means of the mouse of the input operation section 55 and the retail shop ID is input as the keyboard is operated. Then, according to the operation made by the shop person for data transmission, the terminal 50 executes the transmission protocol such as TCP/IP and transmits the retail shop ID to the server apparatus 30.

As the server apparatus 30 that is in a standby state receives the retail shop ID from the terminal 50 in Step S184, it determines if the retail shop is operating on an agreement for the electronic music distribution service or not on the basis of the retail shop ID transmitted from the terminal 50 in Step S185. The server apparatus 30 proceeds to Step S186 if it is verified that the retail shop is operating on an agreement, whereas it returns to Step S182 and issues a request for inputting the retail shop ID once again if it is not verified that the retail shop is operating on an agreement.

If the retail shop ID is verified, the server apparatus 30 issues a request for inputting the user/customer ID purchasing the package media 2 to the terminal 50 in Step S186. Upon receiving the request for inputting the user/customer ID from the server apparatus 30, the terminal 50 displays an image for inputting the user/customer ID on the display section 56 and the user/customer ID is input by a manual operation of the shop person of the retail shop in Step S187. Then, the terminal 50 transmits the user/customer ID to the server apparatus 30 according to the manual operation of the shop person for transmitting the user/customer ID.

As the server apparatus 30 receives the user/customer ID in Step S188, it then checks if the user/customer ID transmitted from the terminal 50 is found in the data base of the users/customers who have subscribed for the electronic music distribution service or not. Then, the server apparatus 30 proceeds to Step S190 if the user/customer ID transmitted from the terminal 50 is found in the data base, whereas it proceeds to Step S192 if the user/customer transmitted from the terminal 50 is not found in the data base.

In Step S190, the server apparatus 30 transmits the discount data of the user/customer ID to the terminal 50. As the terminal 50 receives the discount data in Step S191, the shop person of the retail shop can know that the package media 2 being purchased by the user/customer should be sold at a discount price.

In Step S192, the server apparatus 30 transmits a no-discount notice to the terminal 50. In Step S193, the shop person of the retail shop can know that no discount price is applicable to the package media 2 being purchased by the user/customer. In this way, in this instance, when the user/customer purchases package media 2 in a retail shop, the shop person of the retail shop checks if a discount price is applicable to the package media 2 or not. Therefore, unlike the instance of FIG. 18, the user/customer does not need to produce a sheet of paper showing the discount data transmitted to the recording/reproduction apparatus 20. This arrangement is convenient to the user/customer.

Figure 20:
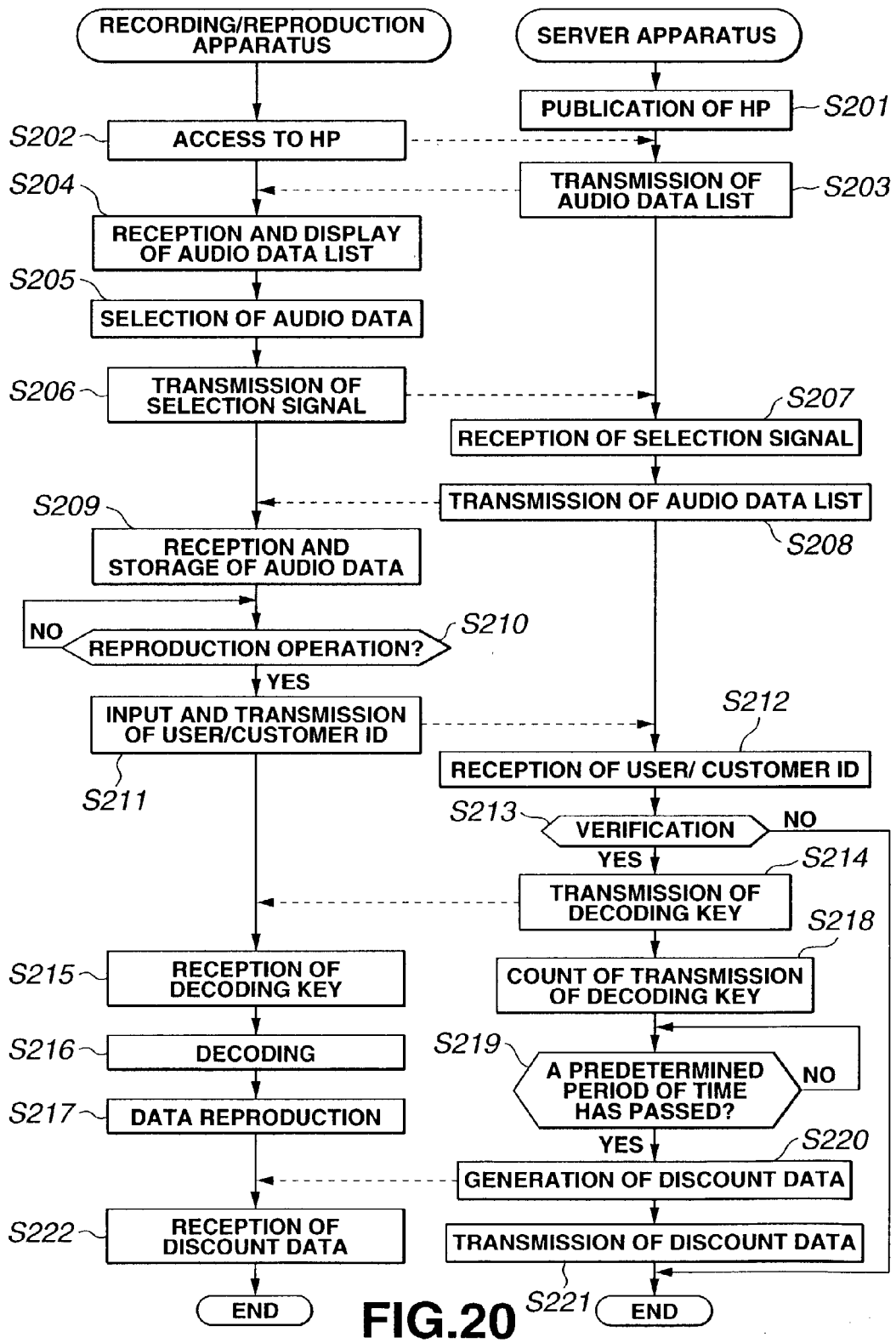
FIG. 20 is a flow chart illustrating another system for generating a discount data according to the frequency of use of the electronic music delivery system by the user/customer when the user/customer purchases a package media.

While the number of times for which audio data are transmitted from the server apparatus 30 to the recording/reproduction apparatus 10 is counted for the purpose of generating a discount data in the instance of FIG. 18, the discount data may alternatively be generated when the decoding key is downloaded as shown in FIG. 20.

Referring to FIG. 20, the server apparatus 30 publishes a home page for the electronic music distribution service on Internet in Step S101. In Step S102, the recording/reproduction apparatus 10 accesses the home page of the server apparatus 30 by means of the URL that may be shown in a magazine. Upon receiving the access request from the recording/reproduction apparatus 10, the server apparatus 30 transmits a list of audio data that can be delivered by the electronic music distribution service to the recording/reproduction apparatus 10 in Step S103. Upon receiving the list of audio data from the server apparatus 30, the recording/reproduction apparatus 10 displays it on the display section 24 in a manner as shown in FIGS. 11A and 11B in Step S104. Then, the user/customer selects audio data to be downloaded by using the mouse and/or the keyboard of the input operation section 23 in Step S105. As the transmission button is manually clicked by the user/customer by means of the input operation section 23, the recording/reproduction apparatus 10 transmits a selection signal representing the audio data to be downloaded that are selected by the user/customer to the server apparatus 30 in Step S106.

Upon receiving the selection signal from the recording/reproduction apparatus 10, the server apparatus 30 retrieves the audio data corresponding to the selection signal from the plurality of audio data in Step S107. It then encodes the one or more than one retrieved audio data corresponding to the selection signal and transmits them to the recording/reproduction apparatus 10 in Step S108.

Upon receiving the audio data transmitted from the server apparatus 30, the recording/reproduction apparatus 10 stores it in Step S109. Then, in Step S120, the recording/reproduction apparatus 10 determines if an operation for reproducing the audio data is performed by the user/customer or not and proceeds to Step S11 if a reproducing operation is performed, whereas it repeats the operation of Step S120 if no reproducing operation is performed. The recording/reproduction apparatus 10 displays an image for inputting the user/customer ID on the display section 24 for the user/customer. As the user/customer ID is input by the user/customer, the recording/reproduction apparatus 10 transmits the input user/customer ID to the server apparatus 30 in Step S11.

Then, the server apparatus 30 receives the user/customer ID transmitted from the recording/reproduction apparatus 10 in Step S112 and verifies the user/customer ID by comparing it with the corresponding user/customer ID registered in advance in Step S113. If the user/customer ID is verified, the server apparatus 30 proceeds to Step S114, where it transmits the decoding key for decoding the coded audio data that are stored in the memory section 21 of the recording/reproduction apparatus 10 to the recording/reproduction apparatus 10. If, on the other hand, the user/customer ID is not verified, it terminate the processing operation.

The recording/reproduction apparatus 10 receives the decoding key transmitted from the server apparatus 30 in Step S115 and causes the control section 26 to operate and read the audio data from the memory section 21 in Step S116. Then, the control section 26 outputs the audio data to the decoder 17. In Step S117, the decoder 17 decodes the audio data by means of the decoding key transmitted from the server apparatus 30. Then, the decoder 17 outputs the decoded audio data to the D/A converter 18, which D/A converter 18 then outputs it to the loudspeaker 19. In this way, the audio data downloaded from the server apparatus 30 are replayed.

On the other hand, after transmitting the decoding key to the recording/reproduction apparatus 10, the server apparatus 30 increments the number of times for which the decoding key of the user/customer ID is transmitted in Step S118. Then, in Step S119, the server apparatus 30 determines if a predetermined period of time, e.g., a month, has passed or not. The server apparatus 30 proceeds to Step S120 if the predetermined period of time has passed, whereas it repeats the operation of Step S119 if the predetermined period of time has not passed.

In Step S120, the server apparatus 30 performs a billing operation according to the number of times for which the decoding key is transmitted for each user/customer ID during the predetermined period of time, or the number of times for which audio data are replayed at the recording/reproduction apparatus 10. In this step, the server apparatus 30 also generates a discount data with which the discount rate that is applied when a user/customer purchases package media 2 increases as a function of the number of times of transmission of the decoding key during the predetermined period of time. Then, in Step S121, the server apparatus 30 transmits the billing data and the discount data respectively to the billing server apparatus 60 and the recording/reproduction apparatus 10.

In Step S122, the recording/reproduction apparatus 10 receives the discount data from the server apparatus 30. As a result, the user/customer can know that he or she is eligible for discount when purchasing package media 2. For example, the user/customer may output the discount data onto a sheet of paper by means of a printer connected to the recording/reproduction apparatus 10 and produce it to a retail shop when he or she purchases package media 2 next time so that the user/customer can buy the package media at a discount price. In the above described system, the discount data of the user/customer who is purchasing package media 2 in a retail shop can be confirmed by the terminal 50 of the retail shop as shown in FIG. 19.

In the above instance, the billing data and the discount data generated by the server apparatus 30 may alternatively be generated by the recording/reproduction apparatus 10 as shown in FIG. 14.

Figure 19:
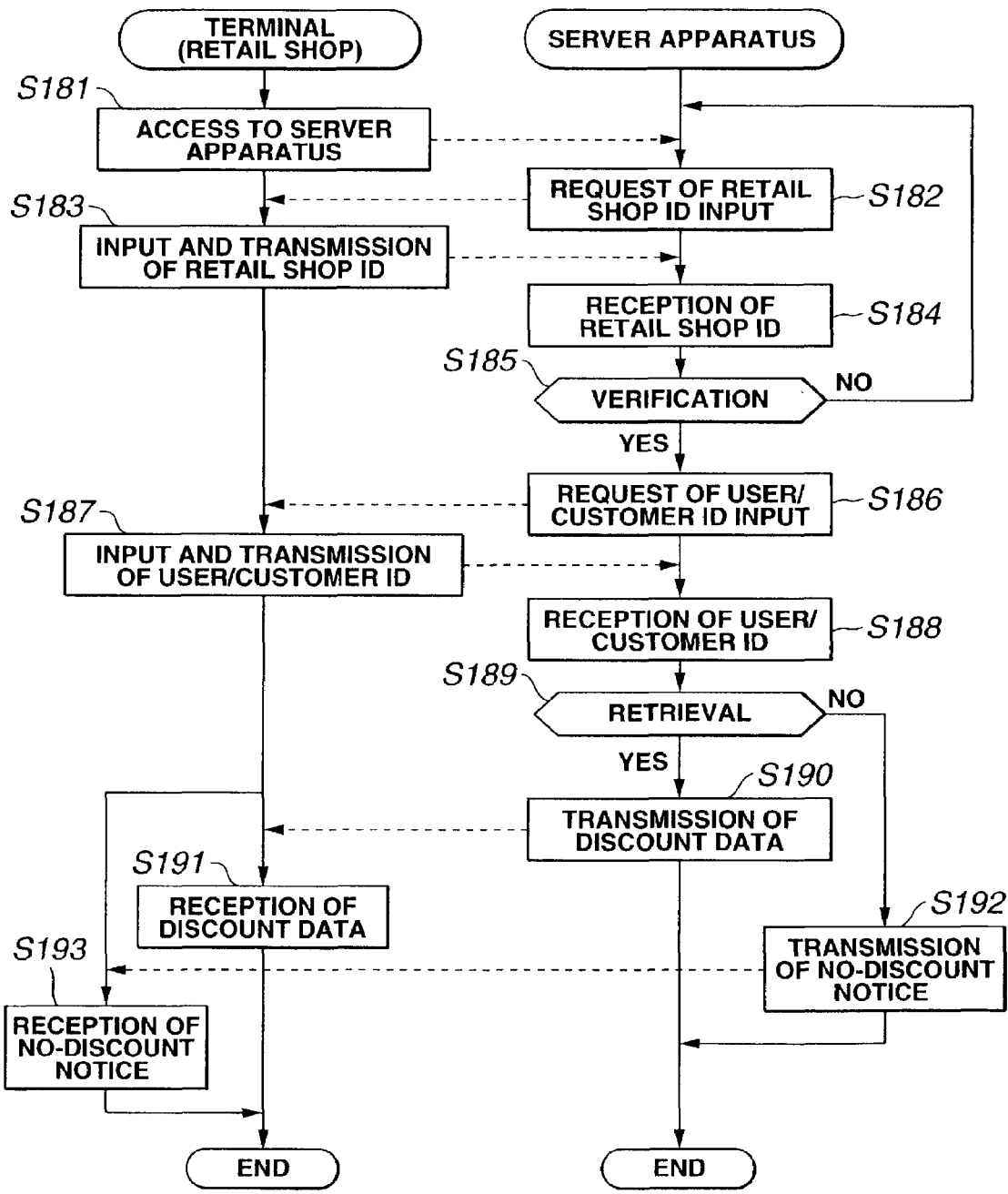
FIG. 19 is a flow chart of the sequence of operation that is followed when the discount data of a user/customer is confirmed at the terminal of a retail shop.

With any of the systems illustrated in FIGS. 18 through 20, the users/customers, or the subscribers, of the electronic music distribution service are encouraged and motivated to purchase package media 2 and utilize the electronic music distribution service more by generating the discount data of each user/customer that reflects the frequency of using the electronic music distribution service and is applied when the subscriber of the electronic music distribution service purchases package media 2.

While the data recording/reproduction system 1 is described above in terms of package media 2 of optical discs 4 that are used as objects of discount, recording media that can be used for the purpose of the invention include disc cartridges such as magnetic discs and optomagnetic discs and IC cards containing a solid state memory. Additionally, data that are recorded on the recording media of package media and data that are electronically distributed by way of Internet 3 for the purpose of the invention are not limited to audio data and may include video data and game software. Furthermore, optical discs 4 that are used for the purpose of the invention do not need to be those storing contents data recorded in advance and dedicated to reproducing and mint optical discs that has no recorded contents data and can be used for recording data can also be used for the purpose of the invention.

INDUSTRIAL APPLICABILITY

As described above, according to the invention, since the purchase history of each user/customer who has purchased package media is managed by means of a purchase history memory, it is possible to provide discount services and other special services only to the users/customers who have purchased package media when they record/reproduce contents data.

The invention claimed is:

1. A data recording apparatus comprising:
   storage means for accumulating a plurality of contents data;
   selection means for selecting at least one contents data out of the plurality of contents data accumulated in the storage means in response to a user/customer input;
   recording means for recording said at least one contents data selected by the selection means in a memory means;
   purchase history memory means for storing a tangible package media purchase history of the user/customer, the tangible package media purchase history including the purchase quantity of predetermined tangible package media by the user/customer; and
   means for determining a discounted amount of the price of recording said at least one contents data corresponding to the purchase quantity of predetermined tangible package media by the user/customer in the package media purchase history of the user/customer, when the number of purchase quantity in the tangible package media purchase history is increased, the discounted amount increases and the price decreases.

2. The apparatus according to claim 1, wherein said means for determining generates billing data for billing said user/customer, charging the discounted amount, on the basis of the purchase history when said recording means records said contents data in said memory means.

3. The apparatus according to claim 1, wherein said means for determining generates billing data on the basis of the number of times for which said recording means recorded said contents data in said memory means.

4. The apparatus according to claim 1, wherein said means for determining generates billing data where no money is charged.

5. The apparatus according to claim 1, further comprising:
   input means for inputting the user/customer identifier of the user/customer purchasing the package media and the media identifier of the package media;
   determining means for determining if the media identified by the media identifier is covered by the delivery service or not; and
   updating means for incrementing the number of purchase slips stored in the purchase history memory means and corresponding to the user/customer identifier input with the media identifier as determined to be covered by the delivery service by the determining means.

6. The apparatus according to claim 5, wherein said input means has a reading means for reading the media identifier from said package media and inputting said user identifier along with the media identifier read out by said reading means.

7. The apparatus according to claim 1, wherein said control means controls so as to prohibit the recording means from recording the contents data in the memory means when the purchase history memory means does not store any purchase history of the user/customer.

8. A data reproducing apparatus comprising:
   storage means for accumulating a plurality of contents data;
   selection means for selecting at least one contents data out of the plurality of contents data accumulated in the storage means in response to a user/customer input;
   reproduction means for reproducing said at least one contents data selected by the selection means;
   purchase history memory means for storing a package media purchase history of the user/customer in the actual world, the package media purchase history including the number of purchasing of predetermined package media by the user/customer; and
   means for determining a discounted amount of the price of reproducing said at least one contents data according to the number of purchasing of predetermined package media by the user/customer in the package media purchase history of the user/customer, when the number of purchasing in the package media purchase history is increased, the discounted amount increases and the price decreases.

9. The apparatus according to claim 8, wherein said means for determining generates billing data for billing said user/customer, charging the discounted amount, on the basis of the purchase history when said reproduction means reproduces said contents data.

10. The apparatus according to claim 8, wherein said means for determining generates billing data on the basis of the number of times for which said reproduction means reproduced said contents data.

11. The apparatus according to claim 8, wherein said means for determining generates billing data where no money is charged.

12. The apparatus according to claim 8, further comprising:
   input means for inputting the user/customer identifier of the user/customer purchasing the package media and the media identifier of the package media;
   determining means for determining if the media identified by the media identifier is covered by the delivery service or not; and updating means for incrementing the number of purchase slips stored in the purchase history memory means and corresponding to the user/customer identifier input with the media identifier as determined to be covered by the delivery service by the determining means.

13. The apparatus according to claim 12, wherein said input means has a reading means for reading the media identifier from said package media and inputting said user identifier along with the media identifier read out by said reading means.

14. The apparatus according to claim 8, wherein said control means controls so as to prohibit the reproduction means from reproducing the contents data when the purchase history memory means does not store any purchase history of the user/customer.

15. A communication apparatus comprising:
a storage means for accumulating a plurality of contents data;
purchase history memory means for storing a package media purchase history of a user/customer in the actual world, the package media purchase history including the number of purchasing of predetermined package media by a user/customer;
transmission means for transmitting at least one of the plurality of contents data accumulated in the storage means to a user/customer terminal; and
means for determining a discounted amount of the price of recording said at least one of the plurality of contents data corresponding to the number of purchasing of predetermined package media by the user/customer in the package media purchase history of the user/customer, when the number of purchasing in the package media purchase history is increased, the discounted amount increases and the price decreases.

16. The apparatus according to claim 15, further comprising:
receiving means for receiving the user/customer identifier of the user/customer purchasing the package media and the media identifier of the package media;
determining means for determining if the media identified by the media identifier is covered by the delivery service or not; and
updating means for incrementing the number of purchase slips stored in the purchase history memory means and corresponding to the user/customer identifier input with the media identifier as determined to be covered by the delivery service by the determining means.

17. A data recording apparatus comprising:
selection means for selecting at least one contents data out of the plurality of contents data accumulated in an accumulating means in response to a user/customer input;
recording means for recording said at least one contents data selected by the selection means in a memory means; and
means for determining a discounted amount of the price of recording said at least one contents data corresponding to the number of purchasing of predetermined package media by the user/customer in a package media purchase history of the user/customer in the actual world, the package media purchase history including the number of purchasing of predetermined package media by the user/customer, when the number of purchasing in the package media purchase history is increased, the discounted amount increases and the price decreases.

18. The apparatus according to claim 17, wherein said means for determining generates billing data for billing said user/customer, charging the discounted amount, on the basis of the purchase history when said recording means records said contents data in said memory means.

19. The apparatus according to claim 17, wherein said means for determining generates billing data on the basis of the number of times for which said recording means recorded said contents data in said memory means.

20. The apparatus according to claim 17, wherein said means for determining generates billing data where no money is charged.

21. The apparatus according to claim 17, further comprising:
reading means for reading a media identifier from a package media and transmission means for transmitting the user/customer identifier with the media identifier read by the reading means.

22. The apparatus according to claim 17, wherein said control means controls so as to prohibit the recording means from recording the contents data in the memory means when the purchase history memory means of package media of an external device does not store any purchase history corresponding to the user/customer.

23. A communication apparatus comprising:
storage means for accumulating a plurality of contents data;
purchase history memory means for storing a package media purchase history of a user/customer in the actual world, the package media purchase history including the number of purchasing of predetermined package media by the user/customer;
transmission means for transmitting at least one of the plurality of contents data accumulated in the storage means to a user/customer terminal; and
means for determining a discounted amount of the price of reproducing said at least one contents data corresponding to the number of purchasing of predetermined package media by the user/customer in the package media purchase history of the user/customer, when the number of purchasing in the package media purchase history is increased, the discounted amount increases and the price decreases.

24. The apparatus according to claim 23 further comprising: receiving means for receiving the user/customer identifier of the user/customer purchasing the package media and the media identifier of the package media;
determining means for determining if the media identified by the media identifier is covered by the delivery service or not; and
updating means for incrementing the number of purchase slips stored in the purchase history memory means and corresponding to the user/customer identifier input with the media identifier as determined to be covered by the delivery service by the determining means.

25. A data reproducing apparatus comprising:
selection means for selecting at least one contents data out of a plurality of contents data accumulated in a storage means in response to a user/customer input;
reproduction means for reproducing said at least one contents data selected by the selection means; and
means for determining a discounted amount of the price of reproducing said at least one contents data corresponding to the number of purchasing of predetermined package media by the user/customer in a package media purchase history of the user/customer in the actual world, the package media purchase history including the number of purchasing of predetermined package media by the user/customer, and when the number of purchasing in the package media purchase history is increased, the discounted amount increases and the price decreases.

26. The apparatus according to claim 25, wherein said means for determining generates billing data for billing said user/customer, charging the discounted amount, on the basis of the purchase history when said reproduction means reproduces said contents data.

27. The apparatus according to claim 25, wherein said means for determining generates billing data on the basis of the number of times for which said reproduction means reproduced said contents data.

28. The apparatus according to claim 25, wherein said means for determining generates billing data where no money is charged.

29. The apparatus according to claim 25, further comprising:
   reading means for reading a media identifier from a package media and transmission means for transmitting the user/customer identifier with the media identifier read by the reading means.

30. The apparatus according to claim 25, wherein said control means controls so as to prohibit the reproduction means from reproducing the contents data when the purchase history memory means of package media of an external device does not store any purchase history corresponding to the user/customer.

31. A data recording apparatus comprising:
   storage means for accumulating a plurality of contents data;
   selection means for selecting at least one contents data out of the plurality of contents data accumulated in the storage means in response to a user/customer input;
   recording means for recording said at least one contents data selected by the selection means in a memory means;
   a first means for generating a number of recordings of said at least one contents data made by the recording means; and
   discount data generating means for generating discounted amount of the price data to be used when a package media is purchased in the actual world, said discount data generated as a function of the number of recordings made by said first means, and when the number of recordings made by first means is increased, the discounted amount increases and the price decreases.

32. A data reproducing apparatus comprising:
   storage means for accumulating a plurality of contents data;
   selection means for selecting at least one contents data out of the plurality of contents data accumulated in the storage means in response to a user/customer input;
   reproduction means for reproducing said at least one contents data selected by the selection means;
   a first means for generating a number of reproductions of said at least one contents data made by said reproduction means; and
   a discount data generating means for generating discounted amount of the price data to be used when a package media is purchased in the actual world, said discount data generated as a function of the number of reproductions made by said first means, and when the purchase quantity in the number of reproductions made by said generator is increased, the discounted amount increases and the price decreases.

\* \* \* \* \*

UNITED STATES PATENT AND TRADEMARK OFFICE
CERTIFICATE OF CORRECTION

| | |
|---|---|
| PATENT NO. | : 7,093,754 B2 |
| APPLICATION NO. | : 10/204910 |
| DATED | : August 22, 2006 |
| INVENTOR(S) | : Yoichiro Sako |

It is certified that error appears in the above-identified patent and that said Letters Patent is hereby corrected as shown below:

On the title page, item (54), line 2, "REPRODUCING AND" should read --REPRODUCING APPARATUS AND--.

In claim 1, column 33, line 56, delete "number of".

In claim 5, column 34, line 6, "the package" should read --the tangible package--.

In claim 5, column 34, line 7, "the package" should read --the tangible package--.

In claim 6, column 34, line 18, "said package" should read --said tangible package--.

In claim 8, column 34, line 35, "a package" should read --a tangible package--.

In claim 8, column 34, lines 36-37, "user/customer in the actual world," should read --user/customer,--.

In claim 8, column 34, line 37, "the package" should read --the tangible package--.

In claim 8, column 34, line 38, "number of purchasing" should read --purchase quantity--.

In claim 8, column 34, lines 38-39, "predetermined package" should read --predetermined tangible package--.

In claim 8, column 34, line 42, "number of purchasing" should read --purchase quantity--.

In claim 8, column 34, line 42, "predetermined package" should read --predetermined tangible package--.

In claim 8, column 34, line 43, "the package" should read --the tangible package--.

In claim 8, column 34, lines 44-45, "number of purchasing" should read --purchase quantity--.

In claim 8, column 34, line 45, "the package" should read --the tangible package--.

In claim 12, column 34, line 63, "the package" should read --the tangible package--.

In claim 12, column 34, line 64, "the package" should read --the tangible package--.

UNITED STATES PATENT AND TRADEMARK OFFICE
CERTIFICATE OF CORRECTION

PATENT NO. : 7,093,754 B2
APPLICATION NO. : 10/204910
DATED : August 22, 2006
INVENTOR(S) : Yoichiro Sako It is certified that error appears in the above-identified patent and that said Letters Patent is hereby corrected as shown below:

In claim 13, column 35, line 8, "said package" should read --said tangible package--.

In claim 15, column 35, line 19, "a package" should read --a tangible package--.

In claim 15, column 35, lines 20-21, "user/customer in the actual world," should read --user/customer,--.

In claim 15, column 35, line 21, "the package" should read --the tangible package--.

In claim 15, column 35, line 22, "number of purchasing" should read --purchase quantity--.

In claim 15, column 35, line 22, "predetermined package" should read --predetermined tangible package--.

In claim 15, column 35, line 29, "number of purchasing" should read --purchase quantity--.

In claim 15, column 35, line 30, "predetermined package" should read --predetermined tangible package--.

In claim 15, column 35, line 31, "the package" should read --the tangible package--.

In claim 15, column 35, line 32, "number of purchasing" should read --purchase quantity--.

In claim 15, column 35, line 32, "the package" should read --the tangible package--.

In claim 16, column 35, line 38, "the package" should read --the tangible package--.

In claim 16, column 35, line 39, "the package" should read --the tangible package--.

In claim 17, column 35, line 59, "number of purchasing" should read --purchase quantity--.

In claim 17, column 35, lines 59-60, "predetermined package" should read --predetermined tangible package--.

In claim 17, column 35, line 60, "a package" should read --a tangible package--.

UNITED STATES PATENT AND TRADEMARK OFFICE
CERTIFICATE OF CORRECTION

| | |
|---|---|
| PATENT NO. | : 7,093,754 B2 |
| APPLICATION NO. | : 10/204910 |
| DATED | : August 22, 2006 |
| INVENTOR(S) | : Yoichiro Sako |

It is certified that error appears in the above-identified patent and that said Letters Patent is hereby corrected as shown below:

In claim 17, column 35, lines 61-62, "user/customer in the actual world," should read --user/customer,--.

In claim 17, column 35, line 62, "the package" should read --the tangible package--.

In claim 17, column 35, line 63, "number of purchasing" should read --purchase quantity--.

In claim 17, column 35, lines 63-64, "predetermined package" should read --predetermined tangible package--.

In claim 17, column 35, lines 64-65, "number of purchasing" should read --purchase quantity--.

In claim 17, column 35, line 65, "the package" should read --the tangible package--.

In claim 21, column 36, lines 15-16, "a package" should read --a tangible package--.

In claim 22, column 36, line 22, "of package" should read --of tangible package--.

In claim 23, column 36, line 28, "a package" should read --a tangible package--.

In claim 23, column 36, lines 29-30, "user/customer in the actual world:' should read --user/customer,--.

In claim 23, column 36, line 30, "the package" should read --the tangible package--.

In claim 23, column 36, line 31, "number of purchasing" should read --purchase quantity--.

In claim 23, column 36, line 31, "predetermined package" should read --predetermined tangible package--.

In claim 23, column 36, line 38, "number of purchasing" should read --purchase quantity--.

In claim 23, column 36, lines 38-39, "predetermined package" should read --predetermined tangible package--.

In claim 23, column 36, line 39, "the package" should read --the tangible package--.

UNITED STATES PATENT AND TRADEMARK OFFICE
CERTIFICATE OF CORRECTION

PATENT NO. : 7,093,754 B2
APPLICATION NO. : 10/204910
DATED : August 22, 2006
INVENTOR(S) : Yoichiro Sako It is certified that error appears in the above-identified patent and that said Letters Patent is hereby corrected as shown below:

In claim 23, column 36, line 41, "number of purchasing" should read --purchase quantity--.

In claim 23, column 36, line 41, "the package" should read --the tangible package--.

In claim 24, column 36, line 46, "the package" should read --the tangible package--.

In claim 24, column 36, line 47, "the package" should read --the tangible package--.

In claim 25, column 36, line 64, "number of purchasing" should read --purchase quantity--.

In claim 25, column 36, lines 64-65, "predetermined package" should read --predetermined tangible package--.

In claim 25, column 36, line 65, "a package" should read --a tangible package--.

In claim 25, column 36, lines 66-67, "user/customer in the actual world," should read --user/customer,--.

In claim 25, column 36, line 67, "the package" should read --the tangible package--.

In claim 25, column 37, line 1, "number of purchasing" should read --purchase quantity--.

In claim 25, column 37, lines 1-2, "predetermined package" should read --predetermined tangible package--.

In claim 25, column 37, line 3, "number of purchasing" should read --purchase quantity--.

In claim 25, column 37, line 3, "the package" should read --the tangible package--.

In claim 29, column 37, lines 20-21, "a package" should read --a tangible package--.

In claim 30, column 37, line 27, "of package" should read --of tangible package--.

In claim 31, column 38, line 8, "a package" should read --a tangible package--.

In claim 31, column 38, line 9, "purchased in the actual world," should read --purchased,--.

UNITED STATES PATENT AND TRADEMARK OFFICE
CERTIFICATE OF CORRECTION

PATENT NO. : 7,093,754 B2
APPLICATION NO. : 10/204910
DATED : August 22, 2006
INVENTOR(S) : Yoichiro Sako It is certified that error appears in the above-identified patent and that said Letters Patent is hereby corrected as shown below:

In claim 31, column 38, line 12, "by first" should read --by said first--.

In claim 32, column 38, lines 27-28, "a package" should read --a tangible package--.

In claim 32, column 38, line 28, "purchased in the actual world,' should read --purchased,--.

Signed and Sealed this

Second Day of January, 2007

JON W. DUDAS
*Director of the United States Patent and Trademark Office*